United States Patent
Sasahara et al.

(10) Patent No.: US 10,364,884 B2
(45) Date of Patent: Jul. 30, 2019

(54) GEAR SHIFT CONTROL DEVICE, A VEHICLE USING THE SAME, AND GEAR SHIFT CONTROL METHOD

(71) Applicant: HONDA MOTOR CO., LTD., Tokyo (JP)

(72) Inventors: Kazuma Sasahara, Saitama (JP); Shintaro Kameda, Saitama (JP); Christopher Hopp, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 258 days.

(21) Appl. No.: 15/447,722

(22) Filed: Mar. 2, 2017

(65) Prior Publication Data

US 2018/0252312 A1   Sep. 6, 2018

(51) Int. Cl.
    *F16H 61/04*      (2006.01)
    *F16H 3/66*       (2006.01)

(52) U.S. Cl.
    CPC .............. *F16H 61/04* (2013.01); *F16H 3/66* (2013.01); *F16H 2061/0444* (2013.01); *F16H 2200/0069* (2013.01); *F16H 2200/2012* (2013.01); *F16H 2200/2046* (2013.01); *F16H 2200/2066* (2013.01); *F16H 2200/2082* (2013.01); *F16H 2306/14* (2013.01)

(58) Field of Classification Search
    CPC .............. F16H 61/04; F16H 61/0248; F16H 2061/0244; F16H 2061/0444; F16H 2061/0448; F16H 2306/14
    See application file for complete search history.

(56) References Cited

U.S. PATENT DOCUMENTS

| | | | | |
|---|---|---|---|---|
| 6,658,339 B1* | 12/2003 | Wright | .................... | F16H 59/02 180/170 |
| 2010/0137101 A1* | 6/2010 | Jeon | .................... | F16H 61/0437 477/84 |
| 2014/0303858 A1* | 10/2014 | Kameda | .................. | F16H 61/04 701/58 |
| 2016/0131250 A1* | 5/2016 | Fan | .......................... | F16H 61/16 701/52 |

FOREIGN PATENT DOCUMENTS

JP   2014-202248 A   10/2014

* cited by examiner

*Primary Examiner* — Edwin A Young
(74) *Attorney, Agent, or Firm* — Westerman, Hattori, Daniels & Adrian, LLP

(57) ABSTRACT

A gear shift mechanism controlled by a gear shift control device includes a plurality of engagement mechanisms and engages three engagement mechanisms to establish any one of a plurality of shift stages. The gear shift control device is adapted to change speed to a desired shift stage set by a manual operation. If a gear shift to the desired shift stage involves the skipping of one or more shift stages and the switching of two or more engagement mechanisms among the plurality of engagement mechanisms that are currently engaged, then the gear shift control device performs the gear shift to the desired shift stage such that the engagement mechanisms to be switched via a shift stage or stages to be skipped are switched one by one.

16 Claims, 12 Drawing Sheets

FIG.4

| | C1 | C2 | C3 | B1 | B2 | B3 | F1 | TRANSMISSION GEAR RATIO | COMMON RATIO |
|---|---|---|---|---|---|---|---|---|---|
| Rvs | | | ○ | | ○ | | L | 4.008 | |
| 1st | | | | ○ | (○) | | R/L | 5.233 | |
| 2nd | | ○ | | ○ | ○ | | R | 3.367 | 1.554 |
| 3rd | | | ○ | ○ | ○ | | R | 2.298 | 1.465 |
| 4th | | ○ | ○ | ○ | | | R | 1.705 | 1.348 |
| 5th | ○ | | (○) | ○ | | | R | 1.363 | 1.251 |
| 6th | ○ | ○ | ○ | | | | R | 1.000 | 1.363 |
| 7th | ○ | | ○ | | ○ | | R | 0.786 | 1.273 |
| 8th | ○ | ○ | | | ○ | | R | 0.657 | 1.196 |
| 9th | ○ | | | | ○ | ○ | R | 0.584 | 1.126 |
| 10th | ○ | ○ | | | | ○ | R | 0.520 | 1.120 |

GEAR SHIFT CONTROL DEVICE, A VEHICLE USING THE SAME, AND GEAR SHIFT CONTROL METHOD

BACKGROUND OF THE INVENTION

Field of the Invention

The present invention relates to a gear shift control device, a vehicle using the same, and a gear shift control method used for controlling a transmission mounted in an automobile.

Description of the Related Art

There has conventionally been blown a gear shift control device of an automatic transmission adapted to engage a plurality of engagement mechanisms to establish a single shift stage (refer to, for example, Japanese Patent Application Laid-Open No. 2014-202248 (Patent Document 1)).

Further, in a conventional gear shift control device, in the case where a stage-by-stage gear shift would result in low gear shift responsiveness, control has been performed to implement a so-called "skip gear shift," in which one Shift stage is skipped to accomplish a gear shift thereby to improve the drivability of a vehicle.

In the conventional gear shift control device, if for example, two engagement mechanisms that have been engaged to establish a current shift stage are both released, then the interruption of a driving force may occur. For this reason, to accomplish a gear shift while preventing the interruption of a driving force, the gear can be directly shifted only to a shift stage that can be established by releasing only one of the two engagement mechanisms which have been engaged, while engaging the other engagement mechanism.

Therefore, in the conventional gear shift control device, if a driver tries to manually perform a gear shift in addition to an automatic gear shift, then a deceleration that the driver truly desires may not be accomplished.

SUMMARY OF THE INVENTION

An object of the present invention is to provide a gear shift control device, vehicle using the same, and a gear Shift control method which enable a further improvement in drivability.

[1] To this end, the present invention provides a gear shift control device (e.g. the gear shift control device ECU in the embodiments; the same applies hereinafter) adapted to control a gear shift mechanism (e.g. the automatic transmission 3 in the embodiments; the same applies hereinafter) which enables a rotational speed output from a drive source (e.g. the engine E in the embodiments; the same applies hereinafter) to be changed into speeds of a plurality of shift stages (e.g. from the first shift stage to the tenth shift stage and the reverse shift stage in the embodiments; the same applies hereinafter) by a manual operation (e.g. by operating the paddle shift lever 33 in the embodiments; the same applies hereinafter), wherein the gear shift mechanism includes a plurality of engagement mechanisms and engages a plurality of engagement mechanisms (e.g. the clutches C1 to C3, the brakes B1 to B3, and the two-way clutch F1 in the embodiments; the same applies hereinafter) to establish any one of a plurality of shift stages.

the gear shift control device is adapted to set a desired shift stage on the basis of the manual operation (e.g. STEP2 in the embodiments; the same applies hereinafter) and to perform a gear shift to the set desired shift stage (e.g. STEP8 in the embodiments; the same applies hereinafter) and In a case where the gear shift to the desired shift stage is a gear shift that skips one or more shift stages (e.g. "YES" in STEP4 in the embodiments; the same applies hereinafter) and requires that two or more engagement mechanisms among the plurality of engagement mechanisms that are currently engaged be switched (e.g. "NO" in STEP5 in the embodiments; the same applies hereinafter), the gear shift to the desired shift stage is performed such that the engagement mechanisms to be switched via a shift stage or stages to be skipped are switched one by one (e.g. STEP9 to STEP11 and STEP8 in the embodiments; the same applies hereinafter).

According to the present invention, even a shift stage that cannot be directly established can be established via a shift stage or stages to be skipped, thus making it possible to accomplish a gear shift to an appropriate desired shift stage set according to an intention of a driver. This enables the operating performance of the gear shift control device to be improved.

[2] Further, according to the present invention, in a case where the gear shift to the desired shift stage is a gear shift that skips two or more shift stages and requires that two or more engagement mechanisms among the plurality of engagement mechanisms that are currently engaged be switched, and a shift stage that permits a skip gear shift exists among the shift stages to be skipped, the gear shift to the desired shift stage is preferably performed such that the gear shift goes through the shift stage that permits the skip gear shift, and the engagement mechanisms to be switched are preferably switched one by one.

According to the present invention, a skip gear shift to a shift stage to be gone through is performed, thus enabling a gear shift close to the intention of the driver can be accomplished in advance, as compared with the case where the skip gear shift is performed after a one-stage shift is completed. This permits a further improvement of the operating performance of the gear shift control device.

[3] Further, in the present invention, in a case where the gear shift to the desired shift stage is a gear shift that skips two or more shift stages and requires that two or more engagement mechanisms among the plurality of engagement mechanisms that are currently engaged be switched, and a shift stage that per nits a skip gear shift to the desired shift stage exists among the shift stages to be skipped, the gear shift to the desired shift stage can be performed, after the gear shift to the shift stage that permits the skip gear shift is completed, such that the engagement mechanisms to be switched are switched via the shift stage that permits the skip gear shift to the desired shift stage and are switched one by one.

According to the present invention, the skip gear shift from a relay shift stage to a desired shift stage is performed, so that the gear shift to the desired shift stage can be accomplished more promptly than the case where the speed is changed by one stage at a time without performing the skip gear shift. Further, even in the case of a shift stage that cannot be directly established, the shift stage can be established by going through a shift stage or stages to be skipped, thus enabling a gear shift to an appropriate desired shift stage set according to an intention of a driver. This permits an improvement of the operating performance of the gear shift control device.

[4] Further, in the present invention, the gear shift mechanism can be adapted to engage three or more engagement mechanisms to establish any one of the plurality of shift stages,

[5] Further, a vehicle according to the present invention includes: the foregoing gear shift control device; the foregoing drive source; and the foregoing gear shift mechanism having the foregoing plurality of engagement mechanisms. According to the present invention, even in the case of a shift stage that cannot be directly established, the shift stage can be established by going through a shift stage or stages to be skipped, thus enabling a gear shift to an appropriate desired shift stage set according to an intention. of a driver. This permits an improvement of the drivability of a vehicle.

[6] Further, the present invention provides a gear shift control device adapted to control a gear shift mechanism that enables a rotational speed output from a drive source to be changed into speeds of a plurality of shift stages by a manual operation, wherein the gear shift mechanism includes a plurality of engagement mechanisms and engages a plurality of engagement mechanisms to establish any one of a plurality of shift stages, the gear shift control device is adapted to set a desired shift stage (e.g. STEP22 in the embodiment; the same applies hereinafter) based on the manual operation and to perform a gear shift to the set desired shift stage (e.g. STEP28 in the embodiment; the same applies hereinafter), and in the case where the gear shift to the desired shift stage is a gear shift that skips one or more shift stages (e.g. "YES" in STEP24 in the embodiment; the same applies hereinafter) and requires that two or more engagement mechanisms among the plurality of engagement mechanisms that are currently engaged be switched (e.g. "NO" in STEP25 in the embodiment; the same applies hereinafter), the desired shift stage is changed to a shift stage that involves one engagement mechanism to be switched among shift stages scheduled to be skipped (e.g. STEP29 in the embodiment; the same applies hereinafter).

According to the present invention, even in the case of a shift stage that does not permit a direct gear shift to a desired shift stage, changing the desired shift stage to the shift stage to be skipped makes it possible to change the speed to a shift stage having a transmission gear ratio close to that of the original desired shift stage according to a manual gear shift operation. This enables the operating performance of the gear shift control device to be improved.

[7] Further, in the present invention, in a case where the gear shift to the desired shift stage is a gear shift that skips two or more shift stages and requires that two or more engagement mechanisms among the plurality of engagement mechanisms that are currently engaged be switched, and a shift stage that per nits the skip gear shift exists among the shift stages to be skipped, the desired shift stage is changed to the shift stage which permits a skip gear shift and which is to be skipped.

According to the present invention, the skip gear shift to a relay shift stage makes it possible to promptly accomplish the gear shift to a shift stage close to an intention of a driver. This permits a further improvement of the operating performance of the gear shift control device.

[8] Further, in the present invention, the gear shift mechanism can be adapted to engage three or more engagement mechanisms to establish any one of the plurality of shift stages.

[9] Further, a vehicle according to the present invention includes: the foregoing gear shift control device; the foregoing drive source; and the foregoing gear shift mechanism having the plurality of engagement mechanisms.

According to the present invention, even in the case of a shift stage that does not permit a direct gear shift to a desired shift stage, changing the desired shift stage to a shift stage to be skipped makes it possible to change the speed to a shift stage having a transmission gear ratio closer to that of the original desired shift stage according to a manual gear shift operation. This permits an improvement of the drivability of a vehicle.

[10] Further, a gear shift control method according to the present invention is a gear shift control method for controlling a gear shift mechanism that enables a rotational speed output from a drive source to be changed into speeds of a plurality of shift stages by a manual operation, wherein the gear shift mechanism includes a plurality of engagement mechanisms and engages a plurality of engagement mechanisms to establish any one of a plurality of shift stages, and the gear shift control method includes:

a target step of setting a desired shift stage base(on the manual operation (e.g. STEP2 in the embodiments; the same applies hereinafter);

a verifying step of determining whether the gear shift to the desired shift stage is a gear shift that skips one or more shift stages and whether the gear shift is in a direct gear shift disabled state in which two or more engagement mechanisms among the plurality of engagement mechanisms currently engaged are required to be switched (e.g. STEP4 to STEP5 in the embodiments; the same applies hereinafter); and a gear shift step of performing, in a case where the gear shift is in the direct gear shift disabled state, the gear shift to the desired shift stage such that the engagement mechanisms to be switched via a shift stage to be skipped are switched one by one (e.g. STEP9 to STEP11 and STEP8 in embodiments; the same applies hereinafter).

The method according to the present invention makes it possible for even a shift stage that cannot be directly established to be established via a shift stage to be skipped, thus enabling a gear shift to an appropriate desired shift stage set according to an intention of a driver. Hence, the gear shift control method according to the present invention permits an improvement of drivability.

[11] Further, in the method according to the present invention, preferably, the verify step verifies whether the gear shift to the desired shift stage is a gear shift that skips two or more shift stages, whether the gear shift requires that two or more engagement mechanisms among the plurality of engagement mechanisms that are currently engaged be switched, and whether the gear shift is in a direct gear shift disabled state in which a shift stage that permits a skip gear shift exists among the shift stages to be skipped, and the gear shift step performs, in a case where the gear shift is in the direct gear shift disabled state, the gear shift to the desired shift stage via a shift stage or stages to be skipped that permit the skip gear shift and such that the engagement mechanisms to be switched are switched one by one.

The method according to the present invention performs the skip gear shift to a relay shift stage, thus enabling a gear shift close to an intention of a driver to be accomplished in advance, as compared with the case where the skip gear shift is performed after a one-stage shift is completed. Hence, the gear shift control method according to the present invention permits a further improvement of the drivability.

[12] Further, in the method according to the present invention, the verifying step verifies whether the gear shift to the desired shift stage is a gear shift that skips two or more shift stages, whether the gear shift requires that two or more engagement mechanisms among the plurality of engagement mechanisms that are currently engaged be switched; and whether the gear shift is in a direct gear shift disabled state in which a shift stage that permits a skip gear shift to the desired shift stage exists among the shift stages to be skipped, and the gear shift step may perform, in a case where the gear shift is in the direct gear shift disabled state, the gear shift to the desired shift stage via a shift stage or stages to be skipped that permit the skip gear shift and such that the engagement mechanisms to be switched are switched one by one.

According to the present invention, the skip gear shift from a relay shift stage to a desired shift stage is performed, so that the gear shift to the desired shift stage can be accomplished more promptly than the case where a gear shift is performed by one stage at a time without performing the skip gear shift. Furthermore, even a shift stage that cannot be directly established can be established via a shift stage or stages to be skipped, thus making it possible to accomplish a gear shift to an appropriate desired shift stage set according to an intention of a driver. Hence, the gear shift control method according to the present invention enables the drivability to be improved.

[13] Further, in the method according to the present invention, the gear shift mechanism can be used for engaging three or more engagement mechanisms to establish any one of the plurality of shift stages.

[14] Further, a gear shift control method according to the present invention is a gear shift control method for controlling a gear shift mechanism that enables a rotational speed output from a drive source to be changed to speeds of a plurality of shift stages by a manual operation, wherein the gear shift mechanism includes a plurality of engagement mechanisms and engages a plurality of engagement mechanisms to establish any one of a plurality of shift stages, and the gear shift control method includes:

a target step of setting a desired shift stage base(on the manual operation (e.g. STEP22 in the embodiment; the same applies hereinafter);

a verifying step of determining whether the ear shift to the desired shift stage is a gear shift that skips one or more shift stages and whether the gear shift is in a direct gear shift disabled state in which two or more engagement mechanisms among the plurality of engagement mechanisms that are currently engaged are required to be switched (e.g. STEP24 to STEP25 in the embodiment; the same applies hereinafter); and a change step of changing, in a case where the gear shift is in the direct gear shift disabled state, the desired shift stage to a shift stage that involves one engagement mechanism to be switched among shift stages scheduled to be skipped (e.g. STEP29 in the embodiment; the same applies hereinafter).

According to the method of the present invention, even in the case of a shift stage that does not permit a direct gear shift to a desired shift stage, changing the desired shift stage to the shift stage to be skipped makes it possible to make a gear shift to a shift stage having a transmission gear ratio closer to that of the original desired shift stage according to a manual gear shift operation. Thus, the gear shift control method according to the present invention permits an improvement of the drivability.

[15] Further, in the method according to the present invention, preferably, the verifying step verifies whether the gear shift to the desired shift stage is a gear shift that skips two or more shift stages, whether the gear shift requires that at least two engagement mechanisms among the plurality of engagement mechanisms that are currently engaged be switched, and whether the gear shift is in a direct gear shift disabled state in which a shift stage that permits a skip gear shift exists among the shift stages to be skipped, and the change step changes, in the case where the gear shift is in the direct gear shift disabled state, the desired shift stage to a shift stage which is to be skipped and which permits a skip gear shift.

The method according to the present invention performs the skip gear shift to a relay shift stage, thus enabling a prompt gear shift to a shift stage close to an intention of a driver, This enables a further improvement of the operating performance of the gear shift control device.

[16] Further, in the method according to the present invention, the gear shift mechanism can be applied to engage three or more engagement mechanisms to establish any one of the plurality of shift stages.

Figure 3:
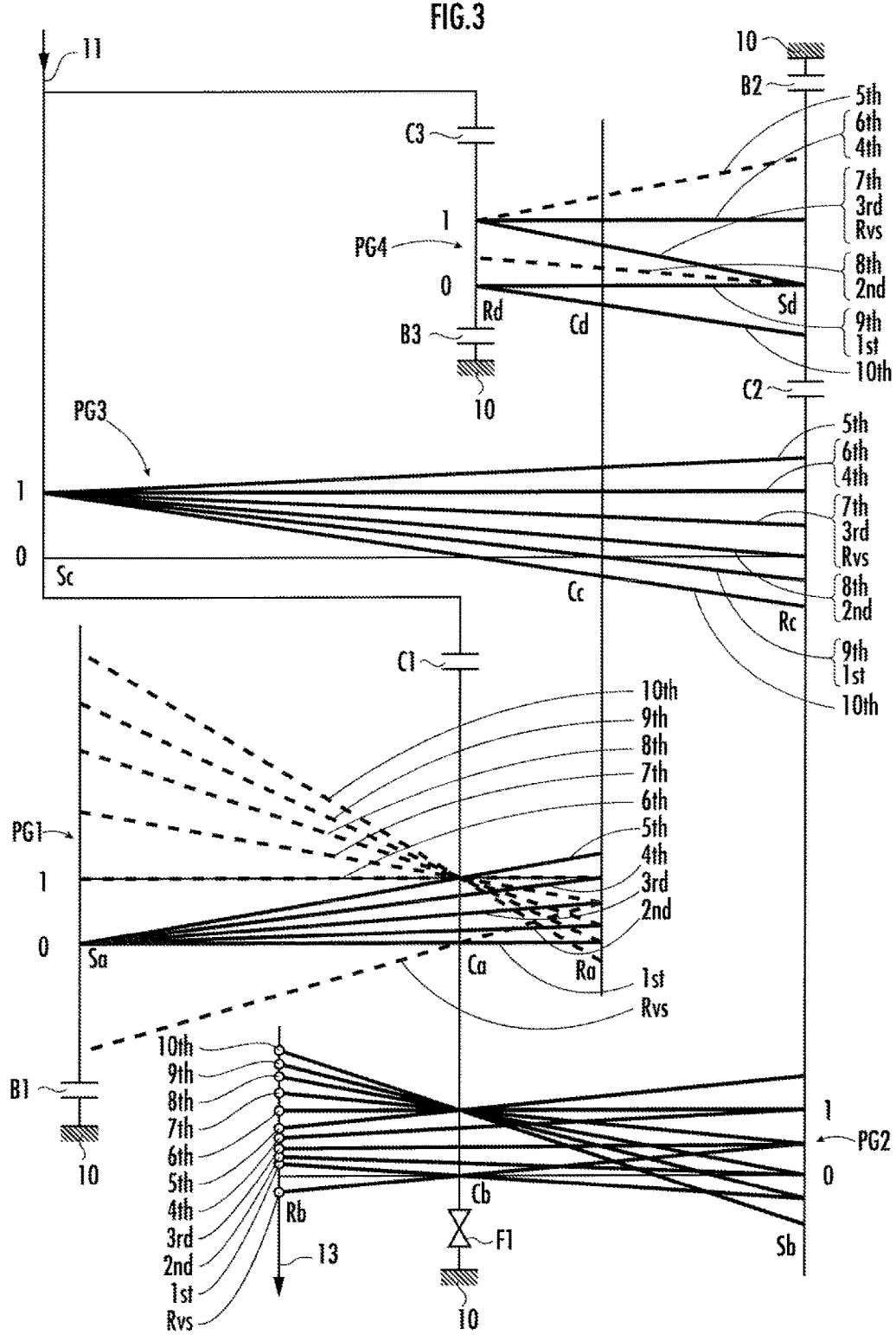
Figure 5:
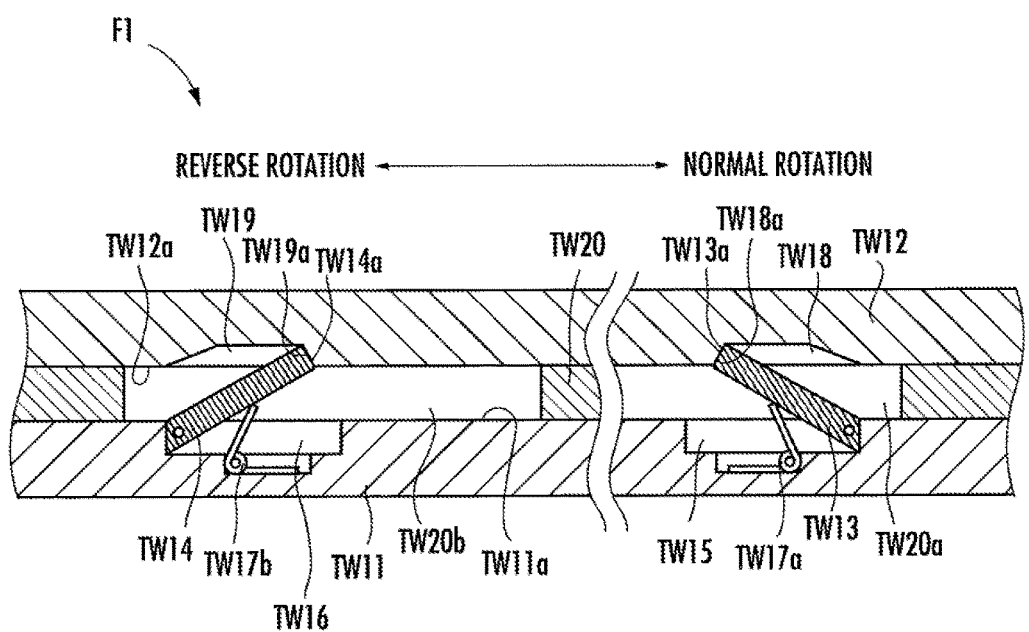
Figure 6:
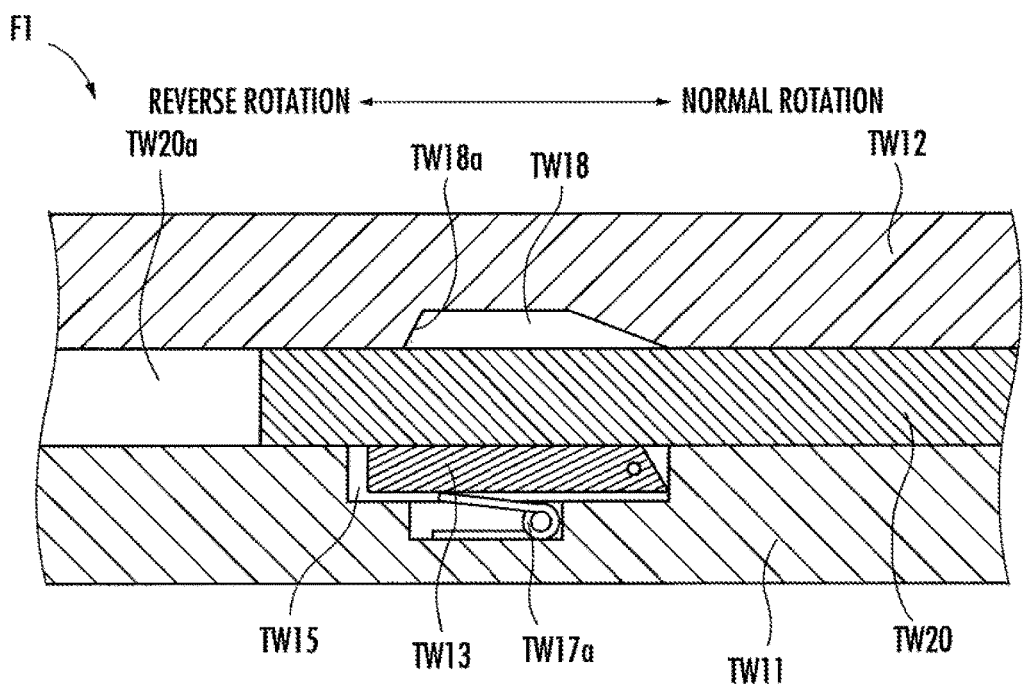
Figure 7:
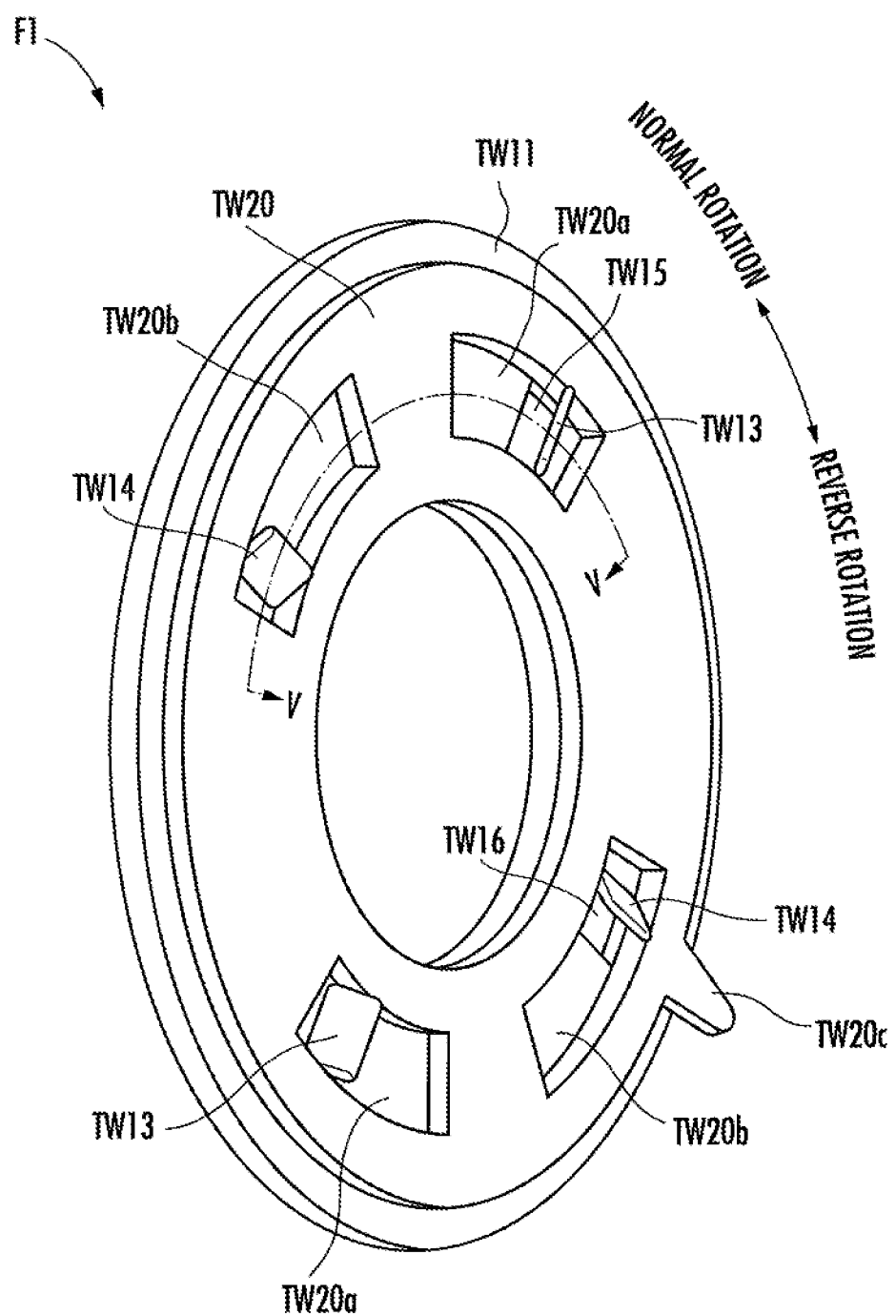
Figure 8:
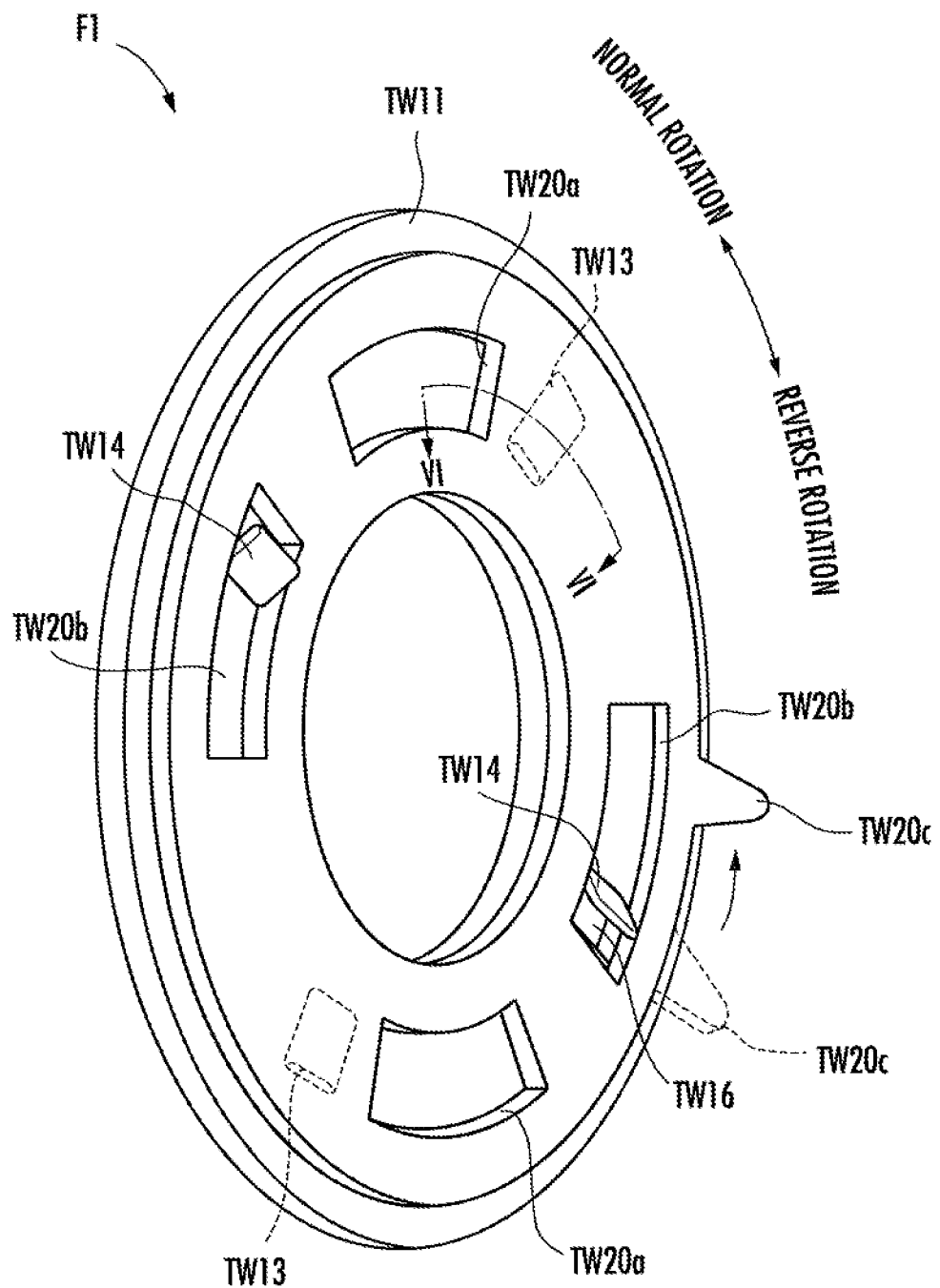
Figure 9:
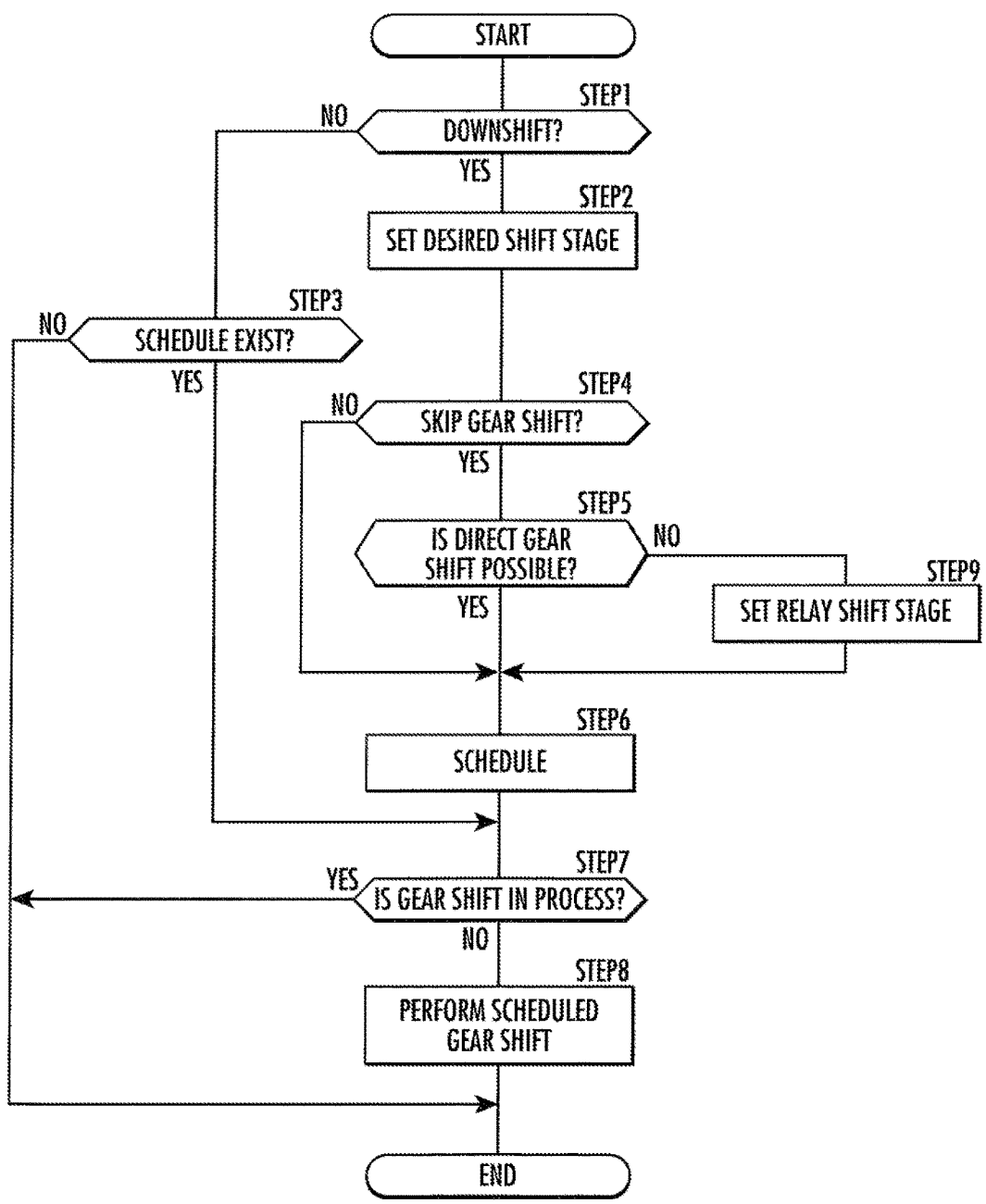
Figure 10:
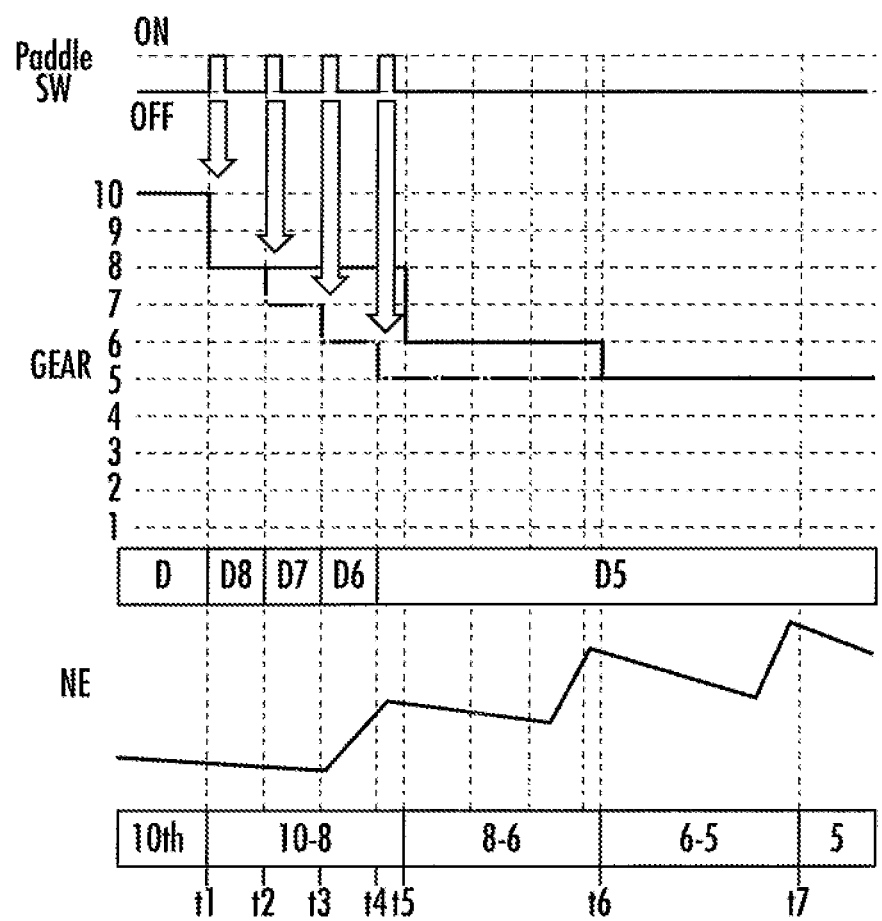
Figure 11:
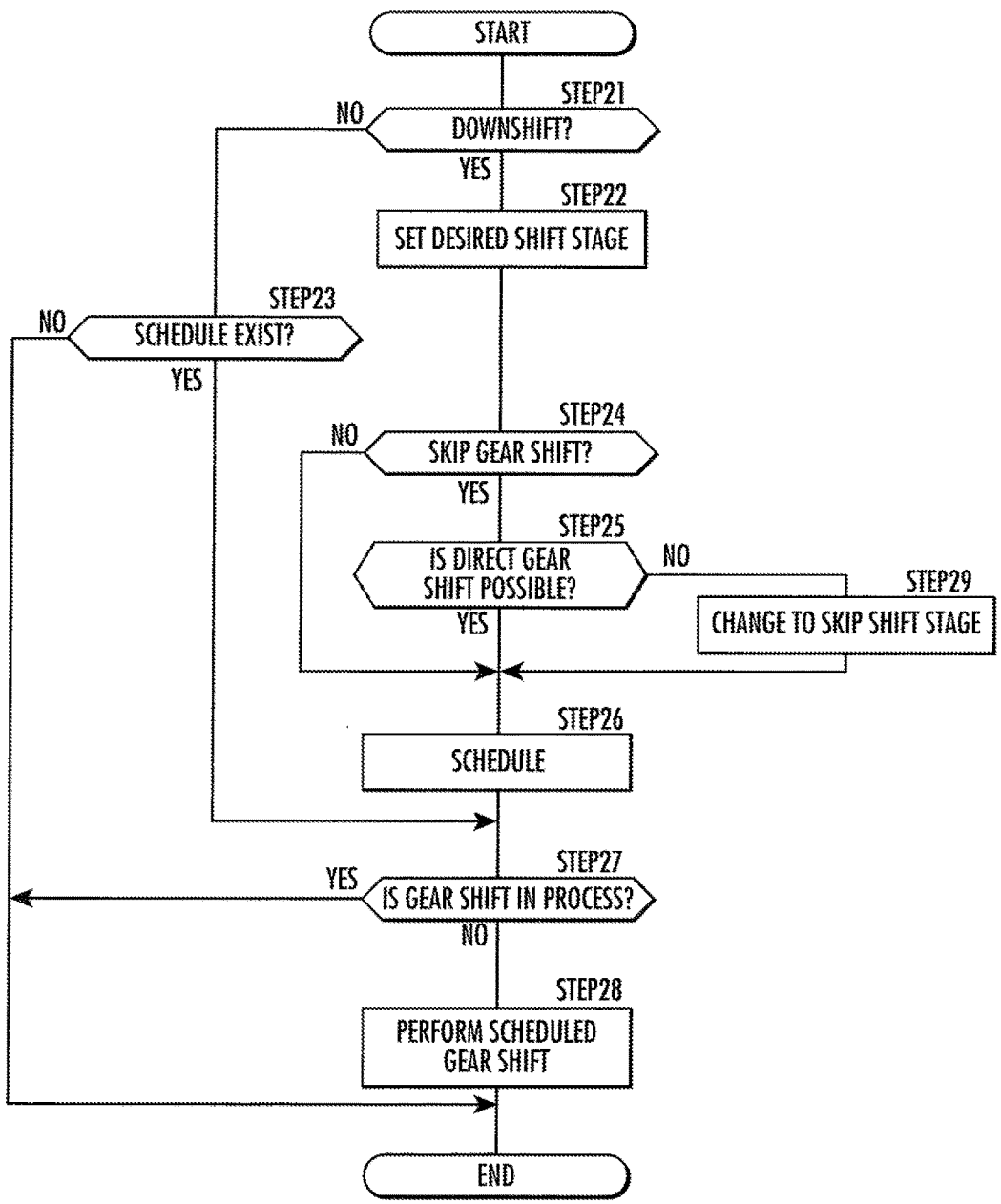
Figure 12:
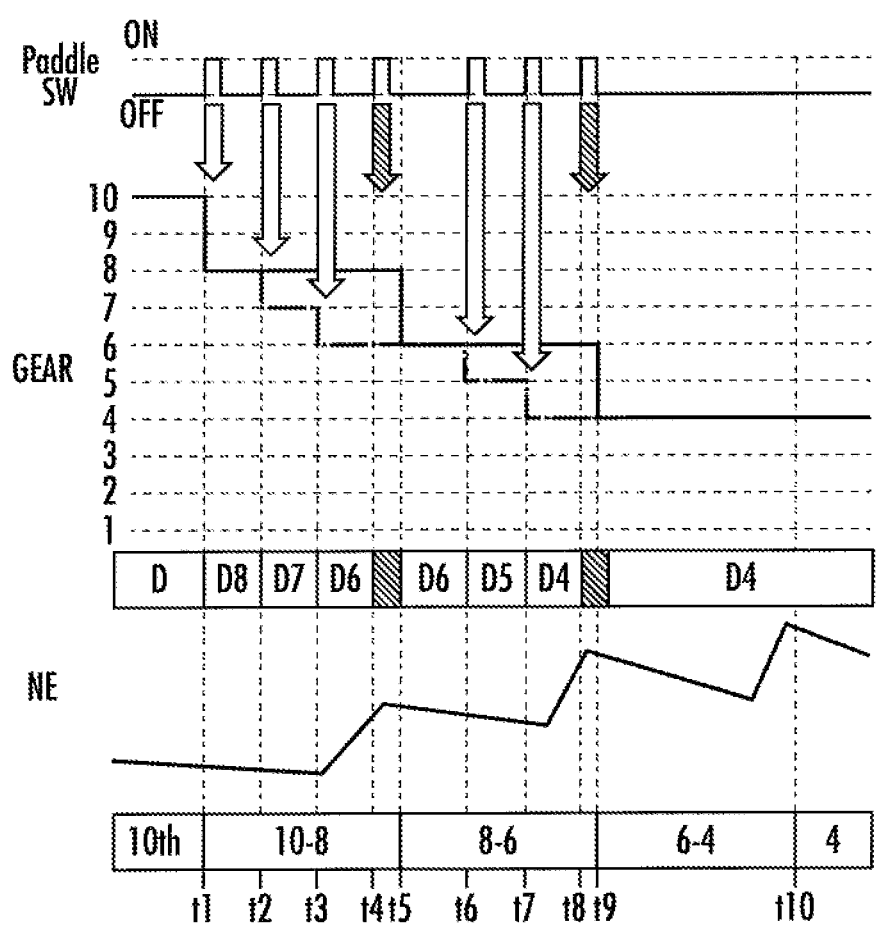

FIG, 2 is a skeleton diagram illustrating a gear shift mechanism controlled by the gear shift control device of the present embodiment;

FIG. 3 is a collinear diagram of the gear shift mechanism of the present embodiment;

FIG. 4 is an explanatory diagram illustrating the engagement state of each engagement mechanism at each shift stage of the present embodiment;

FIG. 5 is an explanatory diagram illustrating a sectional view of a two-way clutch of the present embodiment in a locked state;

FIG. 6 is an explanatory diagram of a sectional view illustrating the two-way clutch of the present embodiment in a reverse rotation prevention state;

FIG. 7 is a perspective view illustrating the two-way clutch of the present embodiment in the locked state;

FIG. 8 is a perspective view illustrating the two-way clutch of the present embodiment in the reverse rotation prevention state;

FIG. 9 is a flowchart illustrating an operation of the gear shift control device of the present embodiment;

FIG. 10 is a timing chart illustrating an example of a gear shift of the gear shift control device of the present embodiment;

FIG. 11 is a flowchart illustrating the operation of a gear shift control device of another embodiment according to the present invention; and FIG. 12 is a timing chart illustrating another example of a gear shift of the gear shift control device of the present embodiment.

DESCRIPTION OF THE PREFERRED EMBODIMENTS

The following will describe a vehicle provided with a gear shift control device using a gear shift control method according to an embodiment of the present invention with reference to the accompanying drawings.

Figure 1:
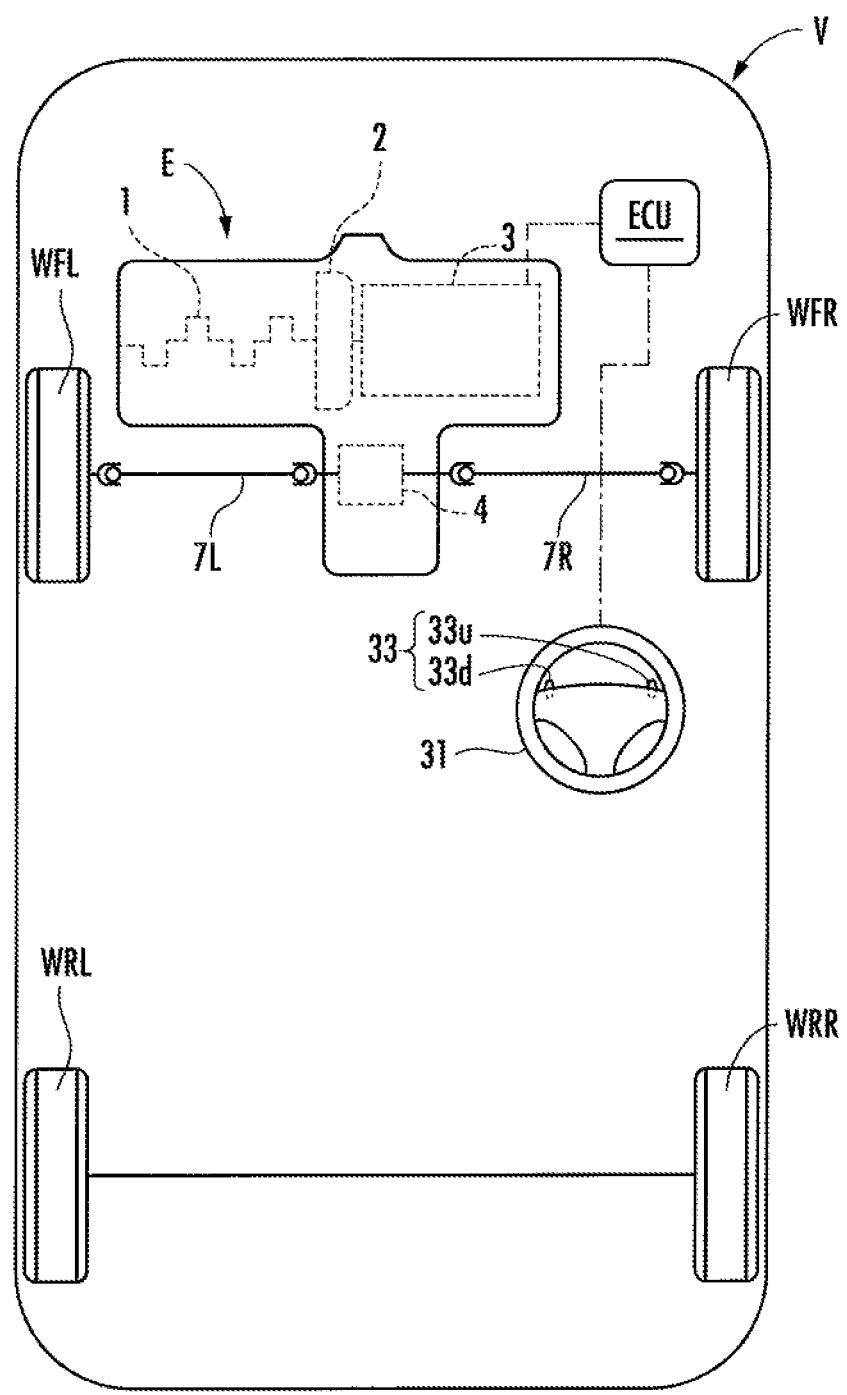
FIG. 1 is an explanatory diagram schematically illustrating a vehicle provided with a gear shift control device of an embodiment according to the present invention.

Referring to FIG. 1, a vehicle V provided with a gear shift control device ECU according to the present embodiment has an engine E (an internal-combustion engine or a drive source; an electric motor may be used in place of the engine E), which is mounted in a vehicle body in a lateral direction such that a crankshaft 1 is oriented in the lateral direction of the vehicle body. The driving force output from the engine E is transmitted to a power transmission unit PT. Then, the power transmission unit PT adjusts the driving force of the engine E according to a selected transmission gear ratio and transmits the adjusted driving force to left and right front wheels WFL, WFR.

The power transmission unit PT is composed of a torque converter 2 connected to the crankshaft 1, an automatic transmission 3 connected to the torque converter 2, and a front differential gear 4 connected to the automatic transmission 3.

The front differential gear 4 is connected to the left and the right front wheels WFL, WFR through a front left axle 7L and a front right axle 7R.

Figure 2:
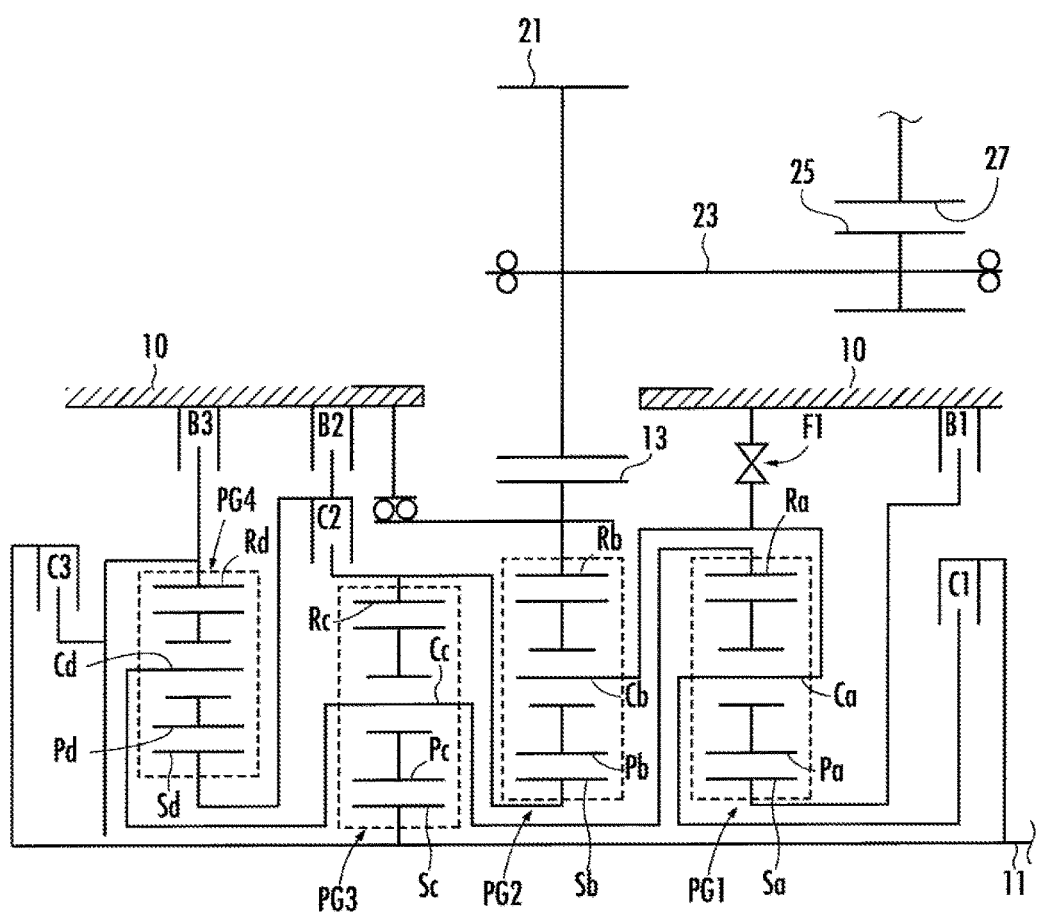

FIG. 2 is the skeleton diagram of the automatic transmission 3. The automatic transmission 3 includes an input shaft 11 as an input member, which is rotatably journaled in a transmission case 10 as a chassis and to which the driving force output from the engine E is transmitted through the intermediary of the torque converter 2 having a lockup clutch and a damper, and an output member 13 composed of an output gear disposed concentrically with the input shaft 11.

The rotation of the output member 13 is transmitted to the left and the right drive wheels (front wheels) WFL, WFR through the intermediary of an idle gear 21 meshing with the output member 13, an idle shaft 23 journaling the idle gear 21, a final drive gear 25 journaled by the idle shaft 23, and the front differential gear 4 provided with a final driven gear 27 meshing with the final drive gear 25. A single-plate or a multi-plate starting clutch configured to be frictionally engageable may be provided in place of the torque converter 2. Further, in place of the front differential gear 4, a propeller shaft may be connected to permit use with a rear-wheel drive vehicle. In addition, a propeller shaft may be connected to the front differential gear 4 through a transfer to permit use with a four-wheel drive vehicle.

In a transmission case 10 as a chassis, four planetary gear mechanisms, namely a first to a fourth planetary gear mechanisms PG 1 to 4, are disposed concentrically with the input shaft 11 in this order from a drive source ENG side. The third planetary gear mechanism PG3 is comprised of a so-called single pinion type planetary gear mechanism composed of a sun gear Sc, a ring gear Rc, and a carrier Cc that rotationally and revolvably journals a pinion Pc meshing with the sun gear Sc and the ring gear Rc.

The so-called single pinion type planetary gear mechanism is referred to also as a minus planetary gear mechanism or a negative planetary gear mechanism, because when the sun gear is rotated with the carrier being locked, the ring gear rotates in a direction different from that of the sun gear. In the single pinion type planetary gear mechanism, when the sun gear is rotated with the ring gear being locked, the carrier rotates in the same direction as that of the sun gear.

Referring to the collinear diagram of the third planetary gear mechanism PG3 illustrated on the second stage from the top of FIG. 3 (a diagram in which the ratio of the relative rotational speeds of the three elements, namely, the sun gear, the carrier and the ring gear can be indicated in terms of a straight line (speed line)), if the three elements, namely Sc, Cc and Rc, of the third planetary gear mechanism PG3, are defined as the first element, the second element and the third element arranged in this order from the left side at the intervals corresponding to the gear ratio (the number of teeth of the ring gear/the number of teeth of the sun gear) in the collinear diagram, then the first element will be the sun gear Sc, the second element will be the carrier Cc, and the third element will be the ring gear Rc.

The ratio of the interval between the sun gear Sc and the carrier Cc to the interval between the carrier Cc and the ring gear Rc is set to h:1, "h" denoting the gear ratio of the third planetary gear mechanism PG3. In the collinear diagram, the lower horizontal line and the upper horizontal line (the line overlapping the 4th and the 6th) denote that the rotational speeds are 0 and 1, respectively (the same rotational speed as that of the input shaft 11).

The fourth planetary gear mechanism PG4 is also comprised of a so-called single pinion type planetary gear mechanism composed of a sun gear Sd, a ring gear Rd, and a carrier Cd that rotationally and revolvably journals a pinion Pd meshing with the sun gear Sd and the ring gear Rd.

Referring to the collinear diagram of the fourth planetary gear mechanism PG4 illustrated on the first stage (the uppermost stage) from the top of FIG. 3, if the three elements, namely, Sd, Cd and Rd, of the fourth planetary gear mechanism PG4, are defined as the fourth element, the fifth element and the sixth element arranged in this order from the left side at the intervals corresponding to the gear ratio in the collinear diagram, then the fourth element will be the ring gear Rd, the fifth element will be the carrier Cd, and the sixth element will be the sun gear Sd. The ratio of the interval between the sun gear Sd and the carrier Cd to the interval between the carrier Cd and the ring gear Rd is set to i:1, "i" denoting the gear ratio of the fourth planetary gear mechanism PG4.

The first planetary gear mechanism PG1 is also comprised of a so-called single pinion type planetary gear mechanism composed of a sun gear Sa, a ring gear Ra, and a carrier Ca that rotationally and revolvably journals a pinion Pa meshing with the sun gear Sa and the ring gear Ra.

Referring to the collinear diagram of the first planetary gear mechanism PG1 illustrated on the third stage from the top of FIG. 3, if the three elements, namely, Sa, Ca and Ra, of the first planetary gear mechanism PG1, are defined as the seventh element, the eighth element and the ninth element arranged in this order from the left side at the intervals corresponding to the gear ratio in the collinear diagram, then the seventh element will be the sun gear Sa, the eighth element will be the carrier Ca, and the ninth element will be the ring gear Ra. The ratio of the interval between the sun gear Sa and the carrier Ca to the interval between the carrier Ca and the ring gear Ra is set to j:1, "j" denoting the gear ratio of the first planetary gear mechanism PG1.

The second planetary gear mechanism PG2 is also comprised of a so-called single pinion type planetary gear mechanism composed of a sun gear Sb, a ring gear Rb, and a carrier. Cb that rotationally and revolvably journals a pinion Pb meshing with the sun gear Sb and the ring gear Rb.

Referring to the collinear diagram of the second planetary gear mechanism PG2 illustrated on the fourth stage (the lowermost stage) from the top of FIG. 3, if the three elements, namely, Sb, Cb and Rb, of the second planetary gear mechanism PG2, are defined as the tenth element, the eleventh element and the twelfth element arranged in this order from the left side at the intervals corresponding to the gear ratio in the collinear diagram, then the tenth element will be the ring gear Rb, the eleventh element will be the carrier Cb, and the twelfth element will be the sun gear Sb. The ratio of the interval between the sun gear Sb and the carrier Cb to the interval between the carrier Cb and the ring gear Rb is set to k:1, "k" denoting the gear ratio of the second planetary gear mechanism PG2.

The sun gear Sc (the first element) of the third planetary gear mechanism PG3 is connected to the input shaft 11. Further, the ring gear Rb (the tenth element) of the second planetary gear mechanism PG2 is connected to the output member 13 composed of an output gear.

Further, the carrier Cc (the second element) of the third planetary gear mechanism PG3, the earner Cd (the fifth element) of the fourth planetary gear mechanism PG4, and the ring gear Ra (the ninth element) of the first planetary gear mechanism PG1 are connected to constitute a first connected body Cc-Cd-Ra. Further, the ring gear Re (the third element) of the third planetary gear mechanism PG3 and the sun gear Sb (the twelfth element) of the second planetary gear mechanism PG2 are connected to constitute a second connected body Rc-Sb. Further, the carrier Ca (the eighth element) of the first planetary gear mechanism. PG1 and the carrier Cb (the eleventh element) of the second planetary gear mechanism PG2 are connected to constitute a third connected body Ca-Cb.

Further, the automatic transmission according to the present embodiment is provided with seven engagement mechanisms, which are three clutches, namely, a first to a third clutches C1 to C3, three brakes, namely, a first to a third brakes B1 to B3, and one two-way clutch F1.

The first clutch C1 is a hydraulically actuated wet type multi-plate clutch, and configured to be switchable between an engaged state, in which the sun gear Sc (the first element) of the third planetary gear mechanism PG3 and the third connected body Ca-Cb are engaged, and a disengaged state, in which the engaged state is cleared.

The third clutch C3 is a hydraulically actuated wet type multi-plate clutch, and configured to be switchable between an engaged state, in which the sun gear Sc (the first element) of the third planetary gear mechanism PG3 and the ring gear Rd (the fourth element) of the fourth planetary gear mechanism PG4 are engaged, and a disengaged state, in which the engaged state is cleared.

The second clutch C2 is a hydraulically actuated wet type multi-plate clutch, and configured to be switchable between an engaged state, in which the sun gear Sd (the sixth element) of the fourth planetary gear mechanism. PG4 and the second connected body Rc-Sb are engaged, and a disengaged state, in which the engaged state is cleared.

The two-way clutch F1 functions also as a fourth brake B4, permits the normal rotation (the rotation in the same direction as the rotational directions of the input shaft 11 and the output member 13) of the third connected body. Ca-Cb, and is configured to be switchable between a reverse rotation prevention state, in which a reverse rotation is blocked, and a locked state, in which the third connected body Ca-Cb is locked to the transmission case 10.

In the reverse rotation prevention state, if a force for causing the third connected body Ca-Cb to rotate in the normal direction is applied, then the two-way clutch F1 is placed in a released state, permitting the rotation, and if a force for causing the third connected body Ca-Cb to rotate in the reverse direction is applied, then the clutch F1 is placed in a locked state, in which the clutch F1 is locked to the transmission case 10, preventing the reverse rotation. In the present embodiment, the two-way clutch corresponds to the switching mechanism.

The first brake B1 is a hydraulically actuated wet type multi-plate brake and configured to be switchable between a locked state, in which the sun gear Sa (the seventh element) of the first planetary gear mechanism PG1 is locked to the transmission case 10, and an unlocked state, in which the lock is released.

The second brake B2 is a hydraulically actuated wet type multi-plate brake and configured to be switchable between a locked state, in which the sun gear Sd (the sixth element) of the fourth planetary gear mechanism PG4 is locked to the transmission case 10, and an unlocked state, in which the lock is released. The third brake B3 is a hydraulically actuated wet type multi-plate brake and configured to be switchable between a locked state, in which the ring gear Rd (the fourth element) of the fourth planetary gear mechanism PG4 is locked to the transmission case 10, and an unlocked state, in which the lock is released.

The state of each of the clutches C1 to C3 and each of the brakes B1 to B3, and the two-way clutch F1 is switched according to vehicle information, such as a vehicle traveling speed, by the gear shift control device ECU composed of a transmission control unit (TCU) illustrated in FIG. 1.

The gear shift control device ECU is comprised of an electronic unit composed of a CPU, memories and the like, which are not illustrated, and capable of receiving predetermined vehicle information, including the traveling speed and the accelerator pedal opening of the vehicle V, the rotational speed and the output torque of the engine E, and the operation information of a paddle shift lever 33, and controls the automatic transmission 3 (gear shift mechanism) by executing a control program retained in a storage device, such as a memory, by the CPU.

As illustrated in FIG. 1, a steering wheel 31 of the vehicle V in the present embodiment is provided with the paddle shift lever 33. Pulling a right paddle 33$u$ toward a driver engages an upshift by manual operation. Pulling a left paddle 33$d$ toward the driver engages a downshift by manual operation. The operation signals of the paddle shift lever 33 are transmitted to the gear shift control device ECU.

The control section for the manual operation in the present invention is not limited to the paddle shift lever 33 of the embodiment, and may be a different type of control section, such as a shift lever disposed between a driver's seat and a front passenger seat or a button disposed on a steering wheel.

As illustrated in FIG. 2, arranged on the axis of the input shaft 11 are the first clutch C1, the first planetary gear mechanism PG1, the second planetary gear mechanism PG2, the third planetary gear mechanism PG3, the second clutch C2, the fourth planetary gear mechanism PG4, and the third clutch C3 in this order from the drive source ENG and a torque converter TC side.

Further, the third brake B3 is disposed on the outer side in the radial direction of the fourth planetary gear mechanism PG4, the second brake B2 is disposed on the outer side in the radial direction of the third clutch C3, the first brake B1 is disposed on the outer side in the radial direction of the first clutch C1, and the two-way clutch F1 is disposed on the outer side in the radial direction of the first planetary gear mechanism PG1.

Placing the three brakes B1 to B3 and the two-way clutch F1 on the outer side in the radial direction of the planetary gear mechanisms or the clutches as described above makes it possible to shorten the shaft length of the automatic transmission 3, as compared with the case where the brakes B1 to B3 and the two-way clutch F1 are disposed together with the planetary gear mechanisms and the clutches on the axis of the. input shaft 11. The third brake B3 may alternatively be disposed on the outer side in the radial direction of the third clutch C3, and the second brake B2 may be disposed on the outer side in the radial direction of the fourth planetary gear mechanism PG4.

Referring to FIG. 3 and FIG. 4, a description will be given of the procedure of establishing each shift stage of the automatic transmission 3 of the embodiment.

To establish the first shift stage, the two-way clutch F1 is set to the reverse rotation prevention state ("R" in FIG. 4), and the first brake B1 and the second brake B2. are set to the locked state. Setting the two-way clutch F1 to the reverse rotation prevention state (R) and setting the second brake B2 to the locked state prevent the reverse rotations of the third connected body Ca-Cb and the sun gear Sa (the seventh element) of the first planetary gear mechanism PG1, and cause the rotational speeds of the third connected body Ca-Cb and the sun gear Sa (the seventh element) of the first planetary gear mechanism PG1 to become zero.

Thus, the three elements, namely, the seventh to the ninth elements Sa, Ca and Ra, of the first planetary gear mechanism PG1 are placed in the locked state, in which the three elements are relatively unrotatable, and the rotational speed of the first connected body Cc-Cd-Ra, which includes the ring gear Ra (the ninth element) of the first planetary gear mechanism PG1, also becomes zero. Then, the rotational speed of the ring gear Rb (the tenth element) of the second planetary gear mechanism PG2, to which the output member 13 is connected, becomes the "1st" illustrated in FIG. 3, thus establishing the first shift stage.

Although the second brake B2 is not required to be set to the locked state to establish the first shift stage, the second brake B2 is locked at the first shift stage in order to ensure a smooth gear shift from the first shift stage to the second shift stage, which will be discussed hereinafter. Further, an engine brake at the first shift stage can be accomplished by switching the two-way clutch F1 from the reverse rotation prevention state (R) to the locked state (L).

To establish the second shift stage, the two-way clutch F1 is set to the reverse rotation prevention state (R), the first brake B1 and the second brake B2 are set to the locked state, and the second clutch C2 is engaged. Setting the two-way clutch F1 to the reverse rotation prevention state permits the normal rotation of the third connected body Ca-Cb. Further, setting the first brake B1 to the locked state causes the rotational speed of the sun gear Sa (the seventh element) of the first planetary gear mechanism PG1 to become zero. Further, setting the second brake B2 to the locked state causes the rotational speed of the sun gear Sd (the sixth element) of the fourth planetary gear mechanism PG4 to become zero.

Further, setting the second clutch C2 to an engaged state causes the rotational speed of the second connected body Rc-Sb to become zero, which is the same speed as the rotational speed of the sun gear Sd (the sixth element) of the fourth planetary gear mechanism PG4. Then, the rotational speed of the ring gear Rb (the tenth element) of the second planetary gear mechanism PG2, to which the output member 13 is connected, becomes the "2nd" illustrated in FIG. 3, thus establishing the second shift stage.

To establish the third shift stage, the two-way clutch F1 is set to the reverse rotation prevention state, the first brake B1 and the second brake B2 are set to the locked state, and the third clutch C3 is engaged. Setting the two-way clutch F1 to the reverse rotation prevention state permits the normal rotation of the third connected body Ca-Cb. Further, setting the second brake B2 to the locked state causes the rotational speed of the sun gear Sa (the seventh element) of the first planetary gear mechanism PG1 to become zero. Further, setting the second brake B2 to the locked state causes the rotational speed of the sun gear Sd (the sixth element) of the fourth planetary gear mechanism PG4 to become zero.

Further, setting the third clutch C3 to the engaged state causes the rotational speed of the ring gear Rd (the fourth element) of the fourth planetary gear mechanism PG4 to become 1, which is the same speed as the rotational speed of the sun gear Sc (the first element) of the third planetary gear mechanism PG3 connected to the input shaft 11. The rotational speed of the sun gear Sd (the sixth element) of the fourth planetary gear mechanism PG4 becomes zero and the rotational speed of the ring gear Rd (the fourth element) becomes 1. Therefore, the rotational speed of the carrier Cd (the fifth element), that is, the rotational speed of the first connected body Cc-Cd-Ra, becomes $i/(i+1)$.

Then, the rotational speed of the ring gear Rb (the tenth element) of the second planetary gear mechanism PG2, to which the output member 13 is connected, becomes the "3rd" illustrated in FIG. 3, thus establishing the third shift stage.

To establish the fourth shift stage, the two-way clutch F1 is set to the reverse rotation prevention state, the first brake B1 is set to the locked state, and the second clutch C2 and the third clutch C3 are set to an engaged state. Setting the two-way clutch F1 to the reverse rotation prevention state permits the normal rotation of the third connected body Ca-Cb, Further, setting the first brake B1 to the locked state causes the rotational speed of the sun gear Sa (the seventh element) of the first planetary gear mechanism PG1 to become zero.

Further, setting the second clutch C2 to the engaged state causes the sun gear Sd (the sixth element) of the fourth planetary gear mechanism PG4 and the second connected body Rc-Sb to rotate at the same speed. Thus, between the third planetary gear mechanism PG3 and the fourth planetary gear mechanism PG4, the carrier Cc (the second element) and the carrier Cd (the fifth element) are engaged, and the ring gear Rc (the third element) and the sun gear Sd (the sixth element) are engaged. At the fourth shift stage at which the second clutch C2 is engaged, one collinear diagram composed of the four elements of the third planetary gear mechanism PG3 and the fourth planetary gear mechanism PG4 can be drawn.

Further, setting the third clinch C3 to the engaged state causes the rotational speed of the ring gear Rd (the fourth element) of the fourth planetary gear mechanism PG4 to become 1, which is the same speed as the rotational speed of the sun gear Sc (the first element) of the third planetary gear mechanism PG3. Hence, of the four elements of the third planetary gear mechanism PG3 and the fourth planetary gear mechanism PG4, two elements will have the same rotational speed, namely, 1.

Thus, each element of the third planetary gear mechanism PG3 and the fourth planetary gear mechanism PG4 is placed in the locked state, in which each element is relatively unrotatable, and the rotational speeds of all the elements of the third planetary gear mechanism PG3 and the fourth planetary gear mechanism PG4 become 1. Further, the rotational speed of the third connected body Ca-Cb becomes $j/(j+1)$, and the rotational speed of the ring gear Rb (the tenth element) of the second planetary gear mechanism PG2, to which the output member 13 is connected, becomes the "4th" illustrated in FIG. 3, thus establishing the fourth shift stage.

To establish the fifth shift stage, the two-way clutch F1 is set to the reverse rotation prevention state, the first brake B1 is set to the locked state, and the first clutch C1 and the third clutch C3 are set to the engaged state. Setting the two-way clutch F1 to the reverse rotation prevention state permits the normal rotation of the third connected body Ca-Cb. Further, setting the first brake B1 to the locked state causes the rotational speed of the sun gear Sa (the seventh element) of the first planetary gear mechanism PG1 to become zero.

Further, setting the first clutch C1 to the engaged state causes the rotational speed of the third connected body Ca-Cb to become 1, which is the same speed as the rotational speed of the sun gear Sc (the first element) of the third planetary gear mechanism PG3. Then, the rotational speed of the ring gear Rb (the tenth element) of the second planetary gear mechanism PG2, to which the output member 13 is connected, becomes the "5th" illustrated in FIG. 3, thus establishing the fifth shift stage.

Establishing the fifth shift stage does not require that the third clutch C3 be engaged. However, at the 4th shift stage and a sixth shift stage, which will be discussed hereinafter, the third clutch C3 has to be engaged, so that the third clutch C3 is placed in the engaged state also at the fifth shift stage to accomplish a smooth downshift from the fifth shift stage to the fourth shift stage and a smooth upshift from the fifth shift stage to the sixth shift stage, which will be discussed hereinafter.

To establish the sixth shift stage, the two-way clutch F1 is set to the reverse rotation prevention state, and the three clutches, namely, the first to the third clutches C1 to C3 are set to the engaged state. Setting the two-way clutch. F1 to the reverse rotation prevention state permits the riming rotation of the third connected body Ca-Cb.

Further, setting the second clutch C2 and the third clutch C3 to the engaged state causes each element of the third planetary gear mechanism PG3 and the fourth planetary gear mechanism PG4 to become relatively unrotatable, as described in relation to the fourth shift stage, and the rotational speed of the second connected body. Rc-Sb to become 1. Further, setting the first clutch. C1 to the engaged state causes the rotational speed of the third connected body Ca-Cb to become 1.

Accordingly, in the second planetary gear mechanism PG2, the carrier Cb (the eleventh element) and the sun gear Sb (the twelfth element) will have the same rotational speed, namely 1, and each element is placed in the locked state, in which each element is relatively unrotatable. Then, the rotational speed of the ring gear Rb (the tenth element) of the second planetary gear mechanism PG2, to which the output member 13 is connected, becomes 1 of the "6th" illustrated in FIG. 3, thus establishing the sixth shift stage.

To establish the seventh shift stage, the two-way clutch F1 is set to the reverse rotation prevention state, the second brake B2 is set to the locked state, and the first clutch C1 and the third clutch C3 are set to the engaged state. Setting the two-way clutch F1 to the reverse rotation prevention state permits the normal rotation of the third connected body Ca-Cb.

Further, setting the second brake B2 to the locked state causes the rotational speed of the sun gear Sd (the sixth element) of the fourth planetary gear mechanism PG4 to become zero. Further, setting the third clutch C3 to the engaged state causes the rotational speed of the ring gear Rd (the fourth element) of the fourth planetary gear mechanism PG4 to become 1, which is the same speed as the rotational speed of the Rill gear Sc (the first element) of the third planetary gear mechanism PG3, and the rotational speed of the first connected body Cc-Cd-Ra, which includes the carrier Cd (the fifth element) of the fourth planetary gear mechanism PG4, to become i/(i+1).

Further, setting the first clutch C1 to the engaged state causes the rotational speed of the third connected body Ca-Cb to become 1, which is the same speed as the rotational speed of the sun gear Sc (the first element) of the third planetary gear mechanism PG3 connected to the input shaft 11. Then, the rotational speed of the ring gear Rb (the tenth element) of the second planetary gear mechanism PG2, to which the output member 13 is connected, becomes the "7th" illustrated in FIG. 3, thus establishing the seventh shift stage.

To establish the eighth shift stage, the two-way clutch F1 is set to the reverse rotation prevention state, the second brake B2 is set to the locked state, and the first clutch C1 and the second clutch C2 are set to the engaged state. Setting the two-way clutch F1 to the reverse rotation prevention state permits the normal rotation of the third connected body Ca-Cb.

Further, setting the second brake B2 to the locked state causes the rotational speed of the sun gear Sd (the sixth element) of the fourth planetary gear mechanism PG4 to become zero. Further, setting the second clutch C2 to the engaged state causes the rotational speed of the second connected body Rc-Sb to become zero, which is the same speed as the rotational speed of the sun gear Sd (the sixth element) of the fourth planetary gear mechanism PG4.

Further, setting the first clutch C1 to the engaged state causes the rotational speed of the third connected body Ca-Cb to become 1, which is the same speed as the rotational speed of the sun gear Sc (the first element) of the third planetary gear mechanism PG3. Then, the rotational speed of the ring gear Rb (the tenth element) of the second planetary gear mechanism PG2, to which the output member 13 is connected, becomes the "8th" illustrated in FIG. 3, thus establishing the eighth shift stage.

To establish the ninth shift stage, the two-way clutch F1 is set to the reverse rotation prevention state, the second brake B2 and the third brake B3 are set to the locked state, and the first clutch C1 is set to the engaged state. Setting the two-way clutch F1 to the reverse rotation prevention state permits the normal rotation of the third connected body Ca-Cb.

Further, setting the second brake B2 to the locked state causes the rotational speed of the sun gear Sd (the sixth element) of the fourth planetary gear mechanism PG4 to become zero. Further, setting the third brake B3 to the locked state causes the rotational speed of the ring gear Rd (the fourth element) of the fourth planetary gear mechanism PG4 to also become zero. This places the elements Sd, Cd, and Rd of the fourth planetary gear mechanism PG4 in the locked state, in which the elements are relatively unrotatable, and the rotational speed of the first connected body Cc-Cd-Ra, which includes the carrier Cd (the fifth element) of the fourth planetary gear mechanism PG4 also becomes zero.

Further, setting the first clutch C1 to the engaged state causes the rotational speed of the third connected body Ca-Cb to become 1, which is the same speed as the rotational speed of the sun gear Sc (the first element) of the third planetary gear mechanism PG3. Then, the rotational speed of the ring gear Rb (the tenth element) of the second planetary gear mechanism PG2, to which the output member 13 is connected, becomes the "9th" illustrated in FIG. 3, thus establishing the ninth shift stage.

To establish the tenth shift stage, the two-way clutch F1 is set to the reverse rotation prevention state, the third brake B3 is set to the locked state, and the first clutch C1 and the second clutch C2 are set to the engaged state. Setting the two-way clutch F1 to the reverse rotation prevention state permits the normal rotation of the third connected body Ca-Cb.

Further, setting the second clutch C2 to the engaged state causes the second connected body Rc-Sb and the sun gear Sd (the sixth element) of the fourth planetary gear mechanism PG4 to rotate at the same speed. In addition, setting the third brake B3 to the locked state causes the rotational speed of the ring gear Rd (the fourth element) of the fourth planetary gear mechanism PG4 to become zero. Further setting the first clutch C1 to the engaged state causes the rotational speed of the third connected body Ca-Cb to become 1, which is the same speed as the rotational speed of the sun gear Sc (the first element) of the third planetary gear mechanism PG3. Then, the rotational speed of the ring gear Rd (the tenth element) of the second planetary gear mechanism PG2, to which the output member 13 is connected, becomes the "10th" illustrated in FIG. 3, thus establishing the tenth shift stage.

To establish the reverse shift stage, the two-way clutch F1 is set to the locked state ("L" in FIG. 4), the second brake B2 is set to the locked state, and the third clutch C3 is set to the engaged state. Setting the second brake B2 to the locked state and the third clutch C3 to the engaged state causes the rotational speed of the first connected body Cc-Cd-Ra to become i/(i+1). Further, setting the two-way clutch F1 to the locked state causes the rotational speed of the third connected body Ca-Cb to become zero. Then, the rotational speed of the ring gear Rb (the tenth element) of the second planetary gear mechanism PG2, to which the output member 13 is connected, becomes "Rvs" which is illustrated in FIG. 3 and which indicates a reverse rotation, thus establishing the reverse shift stage.

The speed lines indicated by the dashed lines in FIG. 3 denote that, following the planetary gear mechanisms that transmit power among the four planetary gear mechanisms, PG1 to PG4, the elements of the remaining planetary gear mechanisms rotate (idle).

FIG. 4 is a diagram illustrating all the states of the clutches C1 to C3, the brakes B1 to B3, and the two-way clutch F1 at each shift stage described above. The circles (O) in the boxes of the three clutches, namely, the first to the third clutches C1 to C3 and the three brakes, namely, the first to the third brakes B1 to B3 denote the engaged state or the locked state, while the blank boxes denote the released state. Further, "R" in the boxes of the two-way clutch F1 denotes the reverse rotation prevention state, while "L" denotes the locked state.

Further, the underlined "R" and "L" denote that the operation of the two-way clutch F1 causes the rotational speed of the third connected body Ca-Cb to become zero. Further, "R/L" denotes switching to L, which indicates the locked state, when the engine brake is applied, whereas R, which indicates the reverse rotation prevention state, applies to a normal operation.

Further, FIG. 4 also illustrates the transmission gear ratio (the rotational speed of the input shaft 11/the rotational speed of the output member 13) at each shift stage in the case where a gear ratio h of the third planetary gear mechanism PG3 is set to 2.734, a gear ratio i of the fourth planetary gear mechanism PG4 is set to 1.614, a gear ratio j of the first planetary gear mechanism PG1 is set to 2.681, and a gear ratio k of the second planetary gear mechanism PG2 is set to 1.914, and a common ratio (the ratio of the transmission gear ratio between shift stages, i.e., a value obtained by dividing the transmission gear ratio of a predetermined shift stage by the transmission gear ratio of a shift stage that is one stage higher than the predetermined shift stage). This shows that the common ratio can be properly set.

Referring now to FIG. 5 to FIG. 8, the two-way clutch F1 will be described in detail. The two-way clutch F1 is configured to be switchable between the locked state, in which the third connected body Ca-Cb is locked to the transmission case 10, and the reverse rotation prevention state, in which the normal rotation of the third connected body Ca-Cb is allowed, whereas the reverse rotation thereof is prevented.

As illustrated in the sectional views of FIG. 5 and FIG. 6, the two-way clutch F1 includes a fixed plate TW11 secured to the transmission case 10, and a rotating plate TW12. As illustrated in FIG. 7, the fixed plate TW11 has an annular (toroidal) shape. Although not illustrated in FIG. 7, the rotating plate TW12 also has an annular (toroidal) shape, as with the fixed plate TW11. The fixed plate TW11 and the rotating plate TW12 are concentrically disposed.

As illustrated in FIG. 5, in the fixed plate TW11, an opposing surface TW11a that opposes the rotating plate TW12 is provided with a plate-like normal rotation prevention side swing section TW13, in which an end TW13a on one side in the circumferential direction of the fixed plate TW11 (the reverse rotational direction of the rotating plate TW12) swings about an end on the other side in the circumferential direction thereof (the normal rotational direction of the rotating plate TW12), and a plate-like reverse rotation preventing side swing section TW14, in which an end TW14a on one side in the circumferential direction of the fixed plate TW11 (the normal rotational direction) swings about an end on the other side in the circumferential direction thereof (reverse rotational direction).

Further, the opposing suit ice TW11a of the fixed plate TW11 is provided with housing sections TW15 and TW16, which are recessed to be capable of housing the normal rotation prevention side swing section TW13 and the reverse rotation prevention side swing section TW14, respectively. The bottom surfaces of the housing sections TW15 and TW16 are provided with biasing members TW17a and TW17b, which are composed of springs that bias the swing sections TW13 and TW14 such that the swing ends TW13a and TW14a of the swing sections TW13 and TW14 corresponding thereto are projected from the housing sections TW15 and TW16.

In the rotating plate TW12, an opposing surface TW12a that opposes the fixed plate TW11 has openings TW18 and TW19 at positions corresponding to the swing sections TW13 and TW14. The first opening TW18 provided at a position corresponding to the normal rotation prevention side swing section TW13 has a first engagement section TW18a, which has a stepped shape engageable with the swing end TW13a of the normal rotation prevention side swing section TW13, the first engagement section TW18a being positioned on the other side in the circumferential direction (the reverse rotational direction side) of the rotating plate TW12.

The second opening TW19 provided at a position corresponding to the reverse rotation prevention side swing section TW14 has a second engagement section TW19a, which has a stepped shape engageable with the swing end TW14a of the reverse rotation prevention side swing section TW14, the second engagement section TW19a being positioned on one side in the circumferential direction (the normal rotational direction side) of the rotating plate TW12.

As illustrated in FIG. 5 and FIG. 7, if the end TW13a of the normal rotation prevention side swing section TW13 and the first engagement section TW18a are in an engageable state, and the end TW14a of the reverse rotation prevention side swing section TW14 and the second engagement section TW19a are in the engageable state, then the normal rotation, and the reverse rotation of the rotating plate TW12 are both blocked. Therefore, a state in which the ends TW13a, TW14a and the engagement sections TW18a, TW19a corresponding thereto engage with each other is the locked state of the two-way clutch F1 in another embodiment.

A switching plate TW20 is placed between the fixed plate TW11 and the rotating plate TW12. As illustrated in FIG. 7, the switching plate TW20 also has an annular (toroidal) shape. The switching plate TW20 is provided with cutout openings TW20a and TW20b at positions corresponding to the swing sections TW13 and TW14, respectively.

Provided on the outer rim of the switching plate TW20 is a projection TW20c that projects outward in the radial direction. As illustrated in FIG. 8, the switching plate TW20 is swingable with respect to the fixed plate TW11.

When the switching plate TW20 is swung from the locked state illustrated in FIG. 7 to the state illustrated in FIG. 8, the first cutout opening TW20a corresponding to the normal rotation prevention side swing section TW13 passes beyond the normal rotation prevention side swing section TW13, and the normal rotation prevention side swing section TW13 is pushed by the switching plate TW20 against the biasing force of the biasing member TW17a and accommodated into the housing section TW15, as illustrated in FIG. 6. This prevents the end TW13a of the normal rotation prevention side swing section TW13 and the first engagement section TW18a from engaging with each other. Hence, the rotating plate TW12 is allowed to rotate to the normal side.

Further, as illustrated in FIG. 8, the second cutout opening TW20b corresponding to the reverse rotation prevention side swing section TW14 is configured such that the end TW14a can engage with the second engagement section TW19a without the reverse rotation prevention side swing section TW14 being accommodated in the housing section TW16 even when the switching plate TW20 is swung from the locked state illustrated in FIG. 7 to the state illustrated in FIG. 8.

Based on the above description, the states illustrated in FIG. 6 and FIG. 8 correspond to the reverse rotation prevention state of the two-way clutch F1 in the present embodiment.

Referring now to FIG. 9 and FIG. 10, the operation of the gear shift control device ECU according to the present embodiment will be described. FIG. 9 is a flowchart illustrating the operation of the gear shift control device ECU according to the present embodiment. First, based on the manual operation information of the paddle shift lever 33 received in STEP1, the procedure verifies whether a downshift has been made manually by a driver.

If the downshift has been made, then the procedure proceeds to STEP2 to set a desired shift stage on the basis of predetermined vehicle information that includes manual operation information (target step). If it is not the downshift in STEP1, the procedure proceeds to STEP3 to verify whether a gear shift schedule is stored in a storage device provided in the gear shift control device ECU. If the gear shift schedule is not stored in STEP3, the current processing is terminated. If the gear shift schedule is stored in STEP3, the procedure proceeds to STEP7.

After setting the desired shift stage on the basis of predetermined vehicle information that includes manual operation information in STEP2, then the procedure proceeds to STEP4 to verify whether a desired shift stage selected by the gear shift control device ECU on the basis of a manual operation is a shift stage that requires a skip gear shift to be accomplished by skipping one or more shift stages. If the gear shift is a single-stage gear shift rather than a skip gear shift, then the procedure proceeds to STEP6 to schedule the single-stage gear shift to be accomplished as the next gear shift, and then stores the schedule in the storage device provided in the gear shift control device ECU.

In step STEP4, in the case where a stage-by-stage gear shift has already been scheduled by a previous manual operation, and although the gear shift by the current manual operation is a stage-by-stage gear shift, if the gear shift by the current manual operation eventually turns into a skip gear shift as a result of being combined with the previous scheduled gear shift, then the gear shift is to be recognized as a skip gear shift. In other words, if a plurality of scheduled stage-by-stage gear shifts are combined into a gear shift that can be effected by skipping one or more shift stages as a whole, then the gear shift is to be recognized as a skip gear shift.

If it is determined in STEP4 that the gear shift is a skip gear shift, then the procedure proceeds to STEP5 to verify whether it is possible to effect a gear shift that enables a skip gear shift to be accomplished by releasing one engagement mechanism and engaging another engagement mechanism, i.e. a so-called direct gear shift. For example, if a gear shift requires that two engagement mechanisms among three engaged engagement mechanisms of a currently established shift stage be released and two other engagement mechanisms be engaged, then the gear shift is not a direct gear shift, because the gear shift cannot be directly accomplished. The state in which a shift stage that cannot be directly established has been set as a desired shift stage is defined as the direct gear shift disabled state.

In the present embodiment, the processing in STEP4 and STEP5 corresponds to the verifying process in the present invention.

If it is determined in STEP5 that a direct gear shift is possible, then a skip gear shift is scheduled in STEP6.

Then, it is verified in STEP7 whether a gear shift is currently being performed. If it is confirmed in STEP7 that the gear shift is being performed, the current processing is terminated since the scheduled gear shift cannot be performed. If it is verified in STEP7 that a gear shift is not being performed, then the procedure proceeds to STEP8 to carry out the scheduled gear shift, thus ending the current processing.

If it is determined in STEP5 that the direct gear shift cannot be accomplished, then the procedure is branched to STEP9 to set a shift stage that can be established by switching one engagement mechanism among shift stages scheduled to be skipped as a relay shift stage and proceeds to STEP6 to schedule a desired shift stage that cannot be directly established as a final shift stage scheduled to be completed together with the set relay shift stage.

In this case, if there are a plurality of candidates of the relay shift stage that permits the direct gear shift and there is a relay shift stage that permits a skip gear shift, then the shift stage that permits a skip gear shift is preferably set as the relay shift stage. Setting the shift stage that permits the skip gear shift as the relay shift stage makes it possible to set the relay shift stage to a shift stage having a transmission gear ratio which is closer to that of the desired shift stage, thus making it possible to set a shift stage that promptly meets a gear. Shift request from a driver, as compared with the case where a gear shift carried out on a stage-by-stage basis.

For the relay shift stage, a shift stage that can be established by a One-stage gear shift may be set, and a shift stage that can be directly established by one gear shift from the relay shift stage to a final desired shift stage may beset as the relay shift stage. This gear shift jumps to the final desired shift stage from the relay shift stage, thus enabling a prompt gear Shift to a final desired shift stage, as compared with the case where a shift is accomplished on the stage-by-stage basis.

Then, the procedure proceeds to STEP7 to verify whether the gear shift is currently being made, and proceeds to STEP8 if the gear Shift is not being made to carry out the gear shift to the relay shift stage. Further, upon completion of the gear shift to the relay shift stage, the procedure proceeds to carry out the gear shift to the final desired shift stage, and then terminates the current processing.

In the present embodiment, the processing from STEP9 to STEP11 and the processing in STEP8 correspond to the gear shift process in the present invention.

The gear shift control device ECU repeatedly carries out the processing illustrated in FIG. 9 at a predetermined control cycle (e.g. 10 ms).

FIG. 10 is a timing chart illustrating a case where a plurality of downshifts are performed by the driver manually operating the paddle shift lever 33 while driving at the tenth shift stage. The axis of abscissa is a time axis. Indicated from the top in order are changes in "the information on the ON/OFF of an operation switch of the paddle shift lever 33," "current desired shift stage indicated by solid line and scheduled shift stage indicated by dot-and-dash line," "shift stage reported to the driver" "the rpm of the engine E." and "current shift stage." In the "current shift stage," each of "10-8," "8-6," and "6-5" denotes that a gear shift is in process from a shift stage of the first numeral to another shift stage of the second numeral.

First, upon receipt of a downshift request at time t1, a gear shift is made from the tenth shift stage to the eighth shift stage, skipping the ninth shift stage. This is because the change width of the transmission gear ratio of the downshift from the tenth shift stage to the ninth shift stage is small, so that the driver cannot feel a deceleration or an adequate acceleration.

When another downshift request is received at time t2, the downshift request is stored in memory as a scheduled one-stage downshift to the seventh stage, since the gear shift to the eighth shift stage is currently in process and not completed. Then, upon receipt of a second downshift request at time t3 while the gear shift to the eighth shift stage is in process, the scheduled shift stage is changed from the seventh shift stage to the sixth shift stage. Thus, the skip gear shift from the eighth shift stage to the sixth shift stage is scheduled. Then, upon receipt of a third downshift request at time t4 in the middle of the gear shift to the eighth shift stage, the scheduled shift stage is changed to the fifth shift stage.

As is obvious from FIG. 4, the gear shift from the eighth shift stage to the fifth shift stage requires the switching of two of the three engagement mechanisms to be engaged to establish each shift stage. For this reason, the direct gear shift from the eighth shift stage to the fifth shift stage cannot be made. Hence, the gear is shifted temporarily to the seventh shift stage or the sixth shift stage before shifting to the fifth shift stage. The operation of the shift lever implies the driver's intention to considerably lower the shift stage, so that the gear shift is preferably made by jumping to the sixth shift stage before reaching the fifth shift stage.

Upon completion of the gear shift to the eighth shift stage at time t5, the gear shift control device ECU immediately carries out the gear shift from the eighth shift stage to the sixth shift stage serving as the relay point so as to accomplish the scheduled gear shift to the fifth shift stage. Then, upon completion of gear shift to the sixth shift stage at time t6, the procedure carries out the gear shift from the sixth shift stage to the fifth shift stage. At time t7, the gear shift to the fifth shift stage is completed.

In FIG. 10, at time t4, the sixth shift stage is set as the relay shift stage and the fifth shift stage is scheduled as the final desired shift stage; however, the operation of the gear shift control device ECU according to the present embodiment is not limited thereto. For example, the seventh shift stage may be set as the relay shift stage, the fifth shift stage may be scheduled as the final desired shift stage, and a skip gear shift from the seventh shift stage to the fifth shift stage may be performed. This also provides the operational advantage of the present invention in that the gear shift to a desired gear shift can be promptly completed through the intermediary of a skipped shift stage.

The gear shift control device ECU and the gear shift control method according to the present embodiment enable a scheduled gear shift and also enable, through the intermediary of a relay shift stage, a gear shift to a shift stage that requires the switching of two engagement mechanisms and therefore cannot be directly established. Thus, a gear shift that follows a driver's intention can be accomplished, enabling drivability to be improved.

FIG. 11 is a flowchart illustrating the operation of a gear shift control device ECU according to another embodiment. The process from STEP21 to STEP28 is the same as that from STEP1 to STEP8 of FIG. 9. If it is determined in STEP25 that a gear shift involves a shift stage that cannot be directly established, then the procedure branches to STEP29 to change, as a new desired shift stage, a shift stage that can be established by switching one engagement mechanism among shift stages scheduled to be skipped, then proceeds to STEP26 to schedule to gear shift to the changed new desired shift stage. After confirming in STEP27 whether a gear shift is currently being performed, if the gear shift is not currently being performed, the procedure proceeds to STEP28 to carry out the gear shift to the scheduled desired shift stage and terminates the current processing. The gear shift control device ECU repeatedly carries out the processing in FIG. 11 at a predetermined control cycle (e.g. 10 ms).

In the embodiment of FIG. 11, the processing in STEP22 corresponds to the target process in the present invention. Further, the processing in STEP24 and STEP25 corresponds to the verifying process in the present invention. Further, the processing in STEP29 corresponds to the change process in the present invention.

FIG. 12 is a timing chart illustrating the operation of the gear shift control device ECU of FIG. 11. As with FIG. 10, FIG. 12 is also a timing chart illustrating a case where a downshift is performed by a driver operating a shift lever while driving at the tenth shift stage. The axis of abscissa is a time axis. Indicated from the top in order are changes in "the information on the ON/OFF of an operation switch of a paddle shift lever 33," "current desired shift stage indicated by solid line and scheduled shift stage indicated by dot-and-dash line," "shift stage reported to the driver," "the rpm of the engine E," and "the current shift stage." In the "current shift stage," each of "10-8," "8-6" and "6-4" denotes that a gear shift is in process from a shift stage of the first numeral to another shift stage of the second numeral, Further, the hatched portions in "shift stage reported to the driver" denote a state in which the manual operation of the paddle shift lever 33 by the driver has not been accepted and an alarm of the rejection of the manual operation is being given to the driver by, for example, flashing an indicator on a shift position display unit. For example, the driver can be notified of the fact that the manual operation has not been accepted by blinking an indicator D6 for the left hatched portion or an indicator D4 for the right hatched portion.

First, upon receipt of a downshift request at time t1 in FIG. 12, the gear is shifted to the eighth shift stage from the tenth shift stage, skipping the ninth shift stage, as with the case illustrated in FIG. 10.

Upon receipt of another downshift request at time t2, the downshift request is stored in memory as a scheduled downshift to the seventh stage, since the gear shift to the eighth shift stage is currently in process and not completed. Then, upon receipt of a second downshift request at time t3 while the gear shift to the eighth shift stage is in process, the scheduled shift stage is changed from the seventh shift stage to the sixth shift stage. Thus, the skip gear shift front the eighth shift stage to the sixth shift stage is scheduled. Then, upon receipt of a third downshift request at time t4 in the middle of the gear shift to the eighth shift stage, the driver will be notified, by the flashing of a shift position lamp or the like, that the downshift cannot be scheduled, and the downshift request is cancelled.

As is obvious from FIG. 4, the gear shift from the eighth shift stage to the fifth shift stage requires the switching of two of the three engagement mechanisms to be engaged to establish each shift stage. For this reason, the direct gear shift from the eighth shift stage to the fifth shift stage cannot be made. Hence, the request for downshift to the fifth shift stage is not accepted, whereas only the gear shift to a shift. stage that permits the direct gear shift is allowed to be scheduled.

Upon completion of the gear shift to the eighth shift stage at time t5, the scheduled skip gear shift from the eighth shift stage to the sixth shift stage is performed. From this moment, new scheduling is accepted. Thereafter, at time t6, upon receipt of a first downshift request during the process of the skip gear shift to the sixth shift stage, the request is stored in memory as a scheduled downshift to the fifth shift stage, because the skip gear shift to the sixth shift stage is currently in process and not yet completed. Then, upon receipt of a second downshift request at time t7 in the middle of the skip gear shift to the sixth shift stage, the scheduled shift stage is changed from the fifth shift stage to the fourth shift stage, and the skip gear shift from the sixth shift stage to the fourth shift stage is scheduled. Then, upon receipt of a third downshift request at time t8 in the middle of the skip gear shift from the eighth shift stage to the sixth shift stage, the driver will be notified, by the flashing of a shift position lamp or the like, that the downshift cannot be scheduled, and the downshift request is cancelled.

As is obvious from FIG. 4, the gear shift from the sixth shift stage to the third shift stage requires the switching of two of the three engagement mechanisms to be engaged to establish each shift stage. For this reason, the direct gear shift from the sixth shift stage to the fourth shift stage cannot be made. Hence, the request for downshift to the fourth shift stage is not accepted, whereas only the gear shift to a shift stage that permits a direct gear shift is allowed to be scheduled.

Upon completion of the gear shift to the sixth shift stage at time t9, the scheduled skip gear shift from the sixth shift stage to the fourth shift stage is performed. From this moment, new scheduling is accepted. Then, at time t10, the skip gear shift to the fourth shift stage is completed.

The gear shift control device ECU according to another embodiment illustrated in FIG. 11 and FIG. 12 is capable of promptly responding to a gear shift request from a driver and accepting a new scheduled gear shift after completion of a gear shift. This makes it possible to promptly handle a change of a current gear shift operation and to therefore improve drivability.

The automatic transmission 3 in the foregoing embodiments may be configured to perform gear shifts to forward nine shift stages by omitting any one shift stage (e.g. the tenth shift stage).

Further, in the foregoing embodiments, the description has been given of the case where the shift position is changed by manually operating the paddle shift lever 33; however, the method of changing the shift position is not limited thereto. For example, a configuration in which a button is pressed to change the shift position may be adopted. In this case, a configuration in which, for example, a selected shift position is determined from a button pressing signal, may be adopted.

Further, in the present embodiment, the description has been given of the case where the two-way clutch F1 is used. Alternatively, however, the two-way clutch F1 may be replaced by a wet type multi-plate brake and a one-way clutch attached to the brake. In this case, the one-way clutch may be configured to permit the normal rotation of the third connected body Ca-Cb and prevent the reverse rotation thereof, and the wet type multi-plate brake may be engaged only for a reverse shift stage or when an engine brake at the first shift stage is desired.

Further, in the present embodiment, the description has been given using the gear shift mechanism (the automatic transmission 3) capable of establishing each shift stage by engaging the three engagement mechanisms; however, the gear shift mechanism according to the present invention is not limited thereto. The present invention can be applied also to, for example, a gear shift mechanism capable of establishing each shift stage by engaging two engagement mechanisms, or a gear shift mechanism capable of establishing each shift stage by engaging four or more engagement mechanisms.

DESCRIPTION OF REFERENCE NUMERALS

1 Crankshaft
2 Torque converter
3 Automatic transmission (Gear shift mechanism)
4 Front differential gear
10 Transmission case (Chassis)
11 Input shaft (Input member)
13 Output member
E Engine (Internal-combustion engine or drive source)
PT Power transmission unit
WFL, WFR Front wheels
WRL, WRR Rear wheels
ECU Gear shift control device
PG1 First planetary gear mechanism
Sa Sun gear (seventh element)
Ca Carrier (eighth element)
Ra Ring, gear (ninth element)
Pa Pinion
PG2 Second planetary gear mechanism
Sb Sun gear (twelfth element)
Cb Carrier (eleventh element)
Rb Ring gear (tenth element)

Pb Pinion
PG3 Third planetary gear mechanism
Sc Sun gear (first element)
Cc Carrier (second element)
Rc Ring gear (third element)
Pc Pinion
PG4 Fourth planetary gear mechanism.
Sd Sun gear (sixth element)
Cd Carrier (fifth element)
Rd Ring gear (fourth element)
Pd Pinion
C1 First clutch
C2 Second clutch
C3 Third clutch
B1 First brake
B2 Second brake
B3 Third brake
F1 Two-way clutch (switching mechanism)
V Vehicle
21 Idle gear
23 Idle shaft
25 Final drive gear
27 Final driven gear
31 Steeling wheel
33 Paddle shift lever
33u Right paddle
33d Left paddle

What is claimed is:

1. A gear shift control device adapted to control a gear shift mechanism that enables a rotational speed output from a drive source to be changed into speeds of a plurality of shift stages by a manual operation,
   wherein the gear shift mechanism includes a plurality of engagement mechanisms and engages the plurality of engagement mechanisms to establish any one of the plurality of shift stages,
   the gear shift control device is adapted to set a desired shift stage based on the manual operation and to perform a gear shift to the set desired shift stage, and
   in a case where the gear shift to the desired shift stage is a gear shift that skips one or more shift stages and requires that two or more engagement mechanisms among the plurality of engagement mechanisms that are currently engaged be switched, the gear shift to the desired shift stage is performed such that the engagement mechanisms to be switched via a shift stage or stages to be skipped are switched one by one.

2. The gear shift control device according to claim 1, wherein
   in a case where the gear shift to the desired shift stage is a gear shift that skips two or more shift stages and requires that two or more engagement mechanisms among the plurality of engagement mechanisms that are currently engaged be switched, and a shift stage that permits a skip gear shift exists among the shift stages to be skipped, the gear shift to the desired shift stage is performed such that the gear shift goes through the shift stage that permits the skip gear shift and the engagement mechanisms to be switched are switched one by one.

3. The gear shift control device according to claim 1, wherein
   in a case where the gear shift to the desired shift stage is a gear shift that skips two or more shift stages and requires that two or more engagement mechanisms among the plurality of engagement mechanisms that are currently engaged be switched, and a shift stage that permits a skip gear shift to the desired shift stage exists among the shift stages to be skipped, the gear shift to the desired shift stage is performed, after the gear shift to the shift stage that permits the skip gear shift is completed, such that the engagement mechanisms to be switched are switched via the shift stage that permits the skip gear shift to the desired shift stage and are switched one by one.

4. The gear shift control device according to claim 1, wherein
   the gear shift mechanism is adapted to engage three or more engagement mechanisms to establish any one of the plurality of shift stages.

5. A vehicle comprising:
   the gear shift control device according to claim 1;
   the drive source; and
   the gear shift mechanism having the plurality of engagement mechanisms.

6. A gear shift control device adapted to control a gear shift mechanism that enables a rotational speed output from a drive source to be changed into speeds of a plurality of shift stages by a manual operation,
   wherein the gear shift mechanism includes a plurality of engagement mechanisms and engages the plurality of engagement mechanisms to establish any one of the plurality of shift stages,
   the gear shift control device is adapted to set a desired shift stage based on the manual operation and to perform a gear shift to the set desired shift stage, and
   in a case where the gear shift to the desired shift stage is a gear shift that skips one or more shift stages and requires that two or more engagement mechanisms among the plurality of engagement mechanisms that are currently engaged be switched, the desired shift stage is changed to a shift stage that involves one engagement mechanism to be switched among shift stages scheduled to be skipped.

7. The gear shift control device according to claim 6, wherein
   in a case where the gear shift to the desired shift stage is a gear shift that skips two or more shift stages and requires that two or more engagement mechanisms among the plurality of engagement mechanisms that are currently engaged be switched, and a shift stage that permits a skip gear shift exists among the shift stages to be skipped, the desired shift stage is changed to the shift stage which permits the skip gear shift and which is to he skipped.

8. The gear shift control device according to claim 6, wherein
   the gear shift, mechanism is adapted to engage three or more engagement mechanisms to establish any one of the plurality of shift stages.

9. A vehicle comprising:
   the gear shift control device according to claim 6;
   the drive source; and
   the gear shift mechanism having the plurality of engagement mechanisms.

10. A gear shift control method for controlling a gear shift mechanism that enables a rotational speed output from a drive source to be changed into speeds of a plurality of shift stages by a manual operation,
    wherein the gear shift mechanism includes a plurality of engagement mechanisms and engages the plurality of engagement mechanisms to establish any one of the plurality of shift stages, and
    the gear shift control method comprises:

a target step of setting a desired shift stage based on the manual operation; a verifying step of determining whether the gear shift to the desired shift stage is a gear shift that skips one or more shift stages and whether the gear shift is in a direct gear shift disabled state in which two or more engagement mechanisms among the plurality of engagement mechanisms currently engaged are required to be switched; and a gear shift step of performing, in a case where the gear shift is in the direct gear shift disabled state, the gear shift to the desired shift stage such that the engagement mechanisms to be switched via a shift stage to be skipped are switched one by one.

11. The gear shift control method according to claim 10, wherein the verifying step verifies whether the gear shift to the desired shift stage is a gear shift that skips two or more shift stages, whether the gear shift requires that two or more engagement mechanisms among the plurality of engagement mechanisms that are currently engaged be switched, and whether the gear shift is in the direct gear shift disabled state in which a shift stage that permits a skip gear shift exists among the shift stages to be skipped, and the gear shift step performs, in a case where the gear shift is in the direct gear shift disabled state, a gear shift to the desired shift stage via a shift stage or stages to be skipped that permit the skip gear shift and such that the engagement mechanisms to be switched are switched one by one.

12. The gear shift control method according to claim 10, wherein the verifying step verifies whether the gear shift to the desired shift stage is a gear shift that skips two or more shift stages, whether the gear shift requires that two or more engagement mechanisms among the plurality of engagement mechanisms currently engaged be switched, and whether the gear shift is in the direct gear shift disabled state in which a shift stage that permits a skip gear shift to the desired shift stage exists among the shift stages to be skipped, and the gear shift step performs, in a case where the gear shift is in the direct gear shift disabled state, the gear shift to the desired shift stage via a shift stage or stages to be skipped that permit the skip gear shift to the desired shift stage and such that the engagement mechanisms to be switched are switched one by one.

13. The gear shift control method according to claim 10, wherein the gear shift mechanism engages three or more engagement mechanisms to establish any one of the plurality of shift stages.

14. A gear shift control method for controlling a gear shift mechanism that enables a rotational speed output from a drive source to be changed into speeds of a plurality of shift stages by a manual operation, wherein the gear shift mechanism includes a plurality of engagement mechanisms and engages the plurality of engagement mechanisms to establish any one of the plurality of shift stages, and the gear shift control method comprises:

a target step of setting a desired shift stage based on the manual operation;

a verifying step of determining whether the gear shift to the desired shift stage is a gear shift that skips one or more shift stages and whether the gear shift is in a direct gear shift disabled state in which two or more engagement mechanisms among the plurality of engagement mechanisms that are currently engaged are required to be switched; and a change step of changing, in a case where the gear shift is in the direct gear shift disabled state, the desired shift stage to a shift stage that involves one engagement mechanism to be switched among shift stages scheduled to be skipped.

15. The gear shift control method according to claim 14, wherein the verifying step verifies whether the gear shift to the desired shift stage is a gear shift that skips two or more shift stages, whether the gear shift requires that at least two engagement mechanisms among the plurality of engagement mechanisms that are currently engaged be switched, and whether the gear shift is in the direct gear shift disabled state in which a shift stage that permits a skip gear shift exists among the shift stages to be skipped, and the change step changes, in the case where the gear shift is in the direct gear shift disabled state, the desired shift stage to a shift stage which is to be skipped and which permits a skip gear shift.

16. The gear shift control method according to claim 14, wherein the gear shift mechanism engages three or more engagement mechanisms to establish any one of the plurality of shift stages.

* * * * *